United States Patent [19]

Yamada et al.

[11] Patent Number: 4,992,929
[45] Date of Patent: Feb. 12, 1991

[54] METHOD OF SYSTEM OPERATION

[75] Inventors: Seiji Yamada, Kyoto; Katsuaki Kono; Kiichi Terashima, both of Shiga, all of Japan

[73] Assignee: Ishida Scales Mfg. Co., Ltd., Shiga, Japan

[21] Appl. No.: 268,763

[22] Filed: Nov. 8, 1988

Related U.S. Application Data

[62] Division of Ser. No. 931,230, Nov. 14, 1986, Pat. No. 4,811,256.

[51] Int. Cl.⁵ .............................................. G06F 9/00
[52] U.S. Cl. .................................. 364/189; 364/191; 340/712; 340/722
[58] Field of Search ............... 364/146, 188, 189, 191, 364/192, 474.22, 474.23; 340/712, 722

[56] References Cited

U.S. PATENT DOCUMENTS

| | | | |
|---|---|---|---|
| 4,403,303 | 9/1983 | Howes | 364/188 |
| 4,413,314 | 11/1983 | Seater et al. | 340/722 |
| 4,451,895 | 5/1984 | Sliwkowski | 364/188 |
| 4,568,072 | 2/1986 | Pietroski | 364/146 |
| 4,628,444 | 12/1986 | Nozawa et al. | 340/722 |
| 4,639,881 | 1/1987 | Zingher | 364/188 |
| 4,642,792 | 2/1987 | Clements et al. | 364/900 |
| 4,679,137 | 7/1987 | Lane et al. | 364/188 |

Primary Examiner—Allen R. MacDonald
Attorney, Agent, or Firm—Flehr, Hohbach, Test, Albritton & Herbert

[57] ABSTRACT

For a system such as a combinational weighing system that requires a large number of parameters to be set for its operation, groups of parameters which frequently assume the same sets of values are identified and each of such sets is assigned a reservation number. Memory space for storing values assumed by the parameters can be reduced if these values are grouped by such frequently occurring combinations and the user specifies a single reservation number instead of specifying values of the individual parameters. Selection of operating condition is effected by an input device with a touch screen. For some parameters, currently set values are displayed as a bar graph and a user can set or reset a value directly on the screen by moving a cursor on the bar graph.

5 Claims, 23 Drawing Sheets

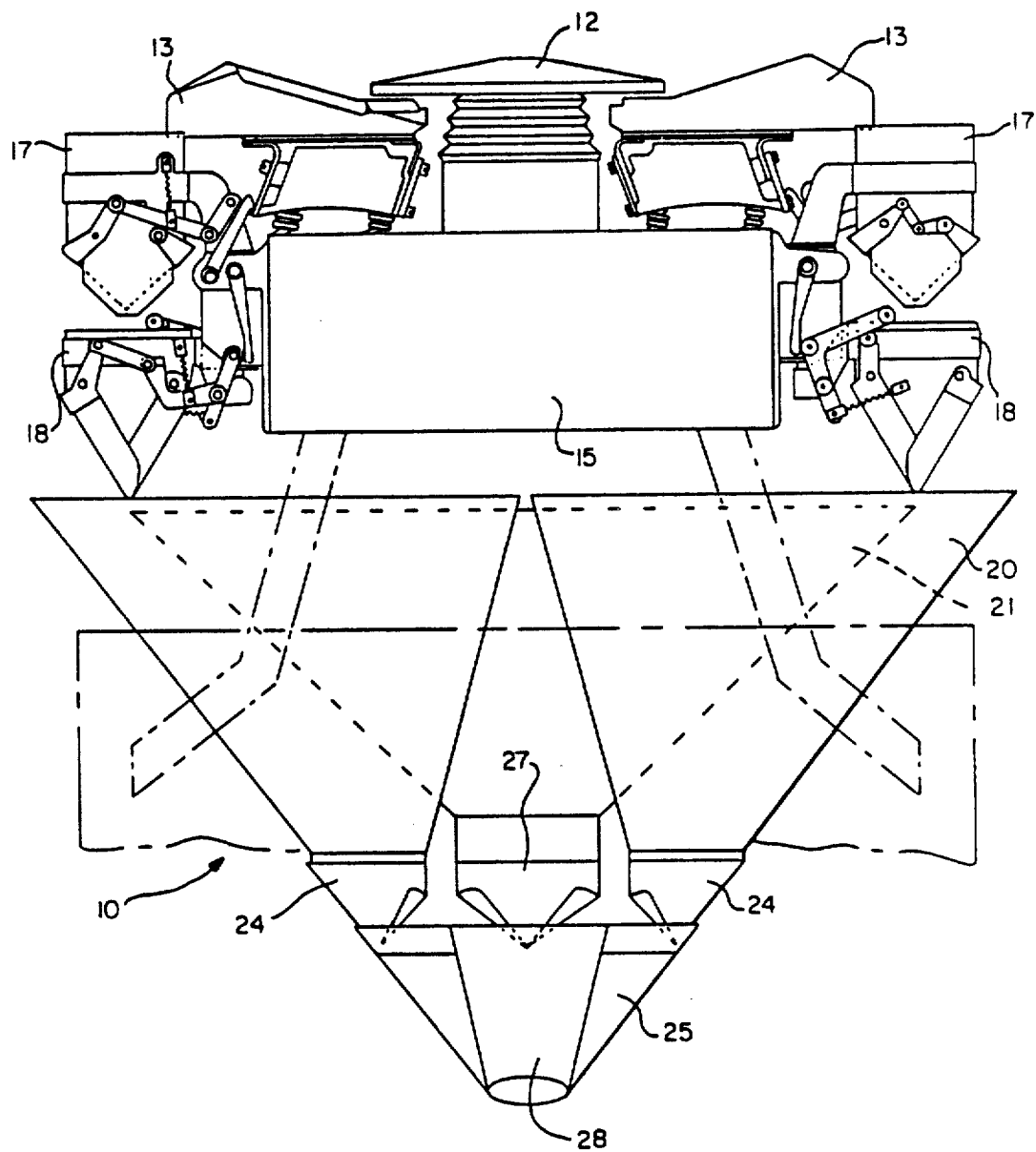
FIG.—1

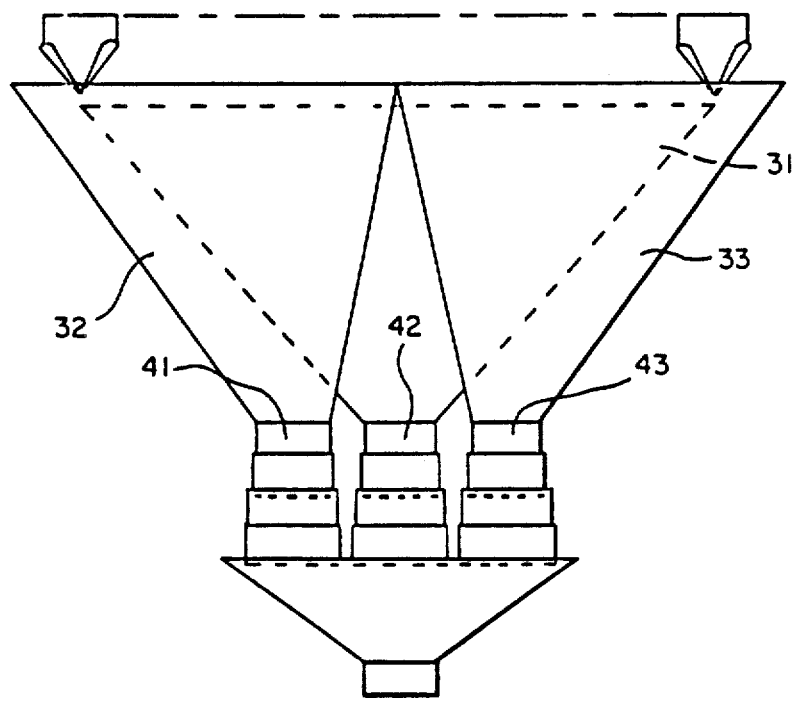
FIG. — 2
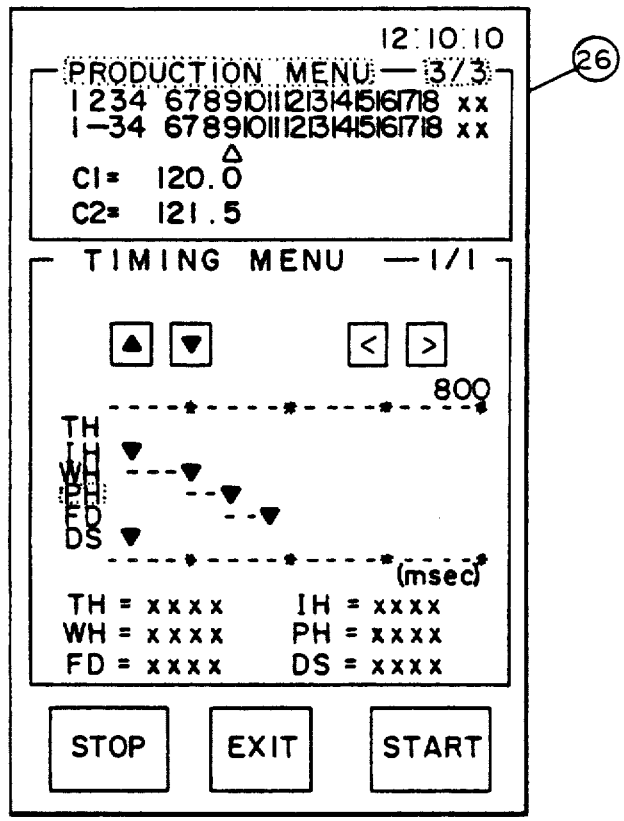
FIG.—4H

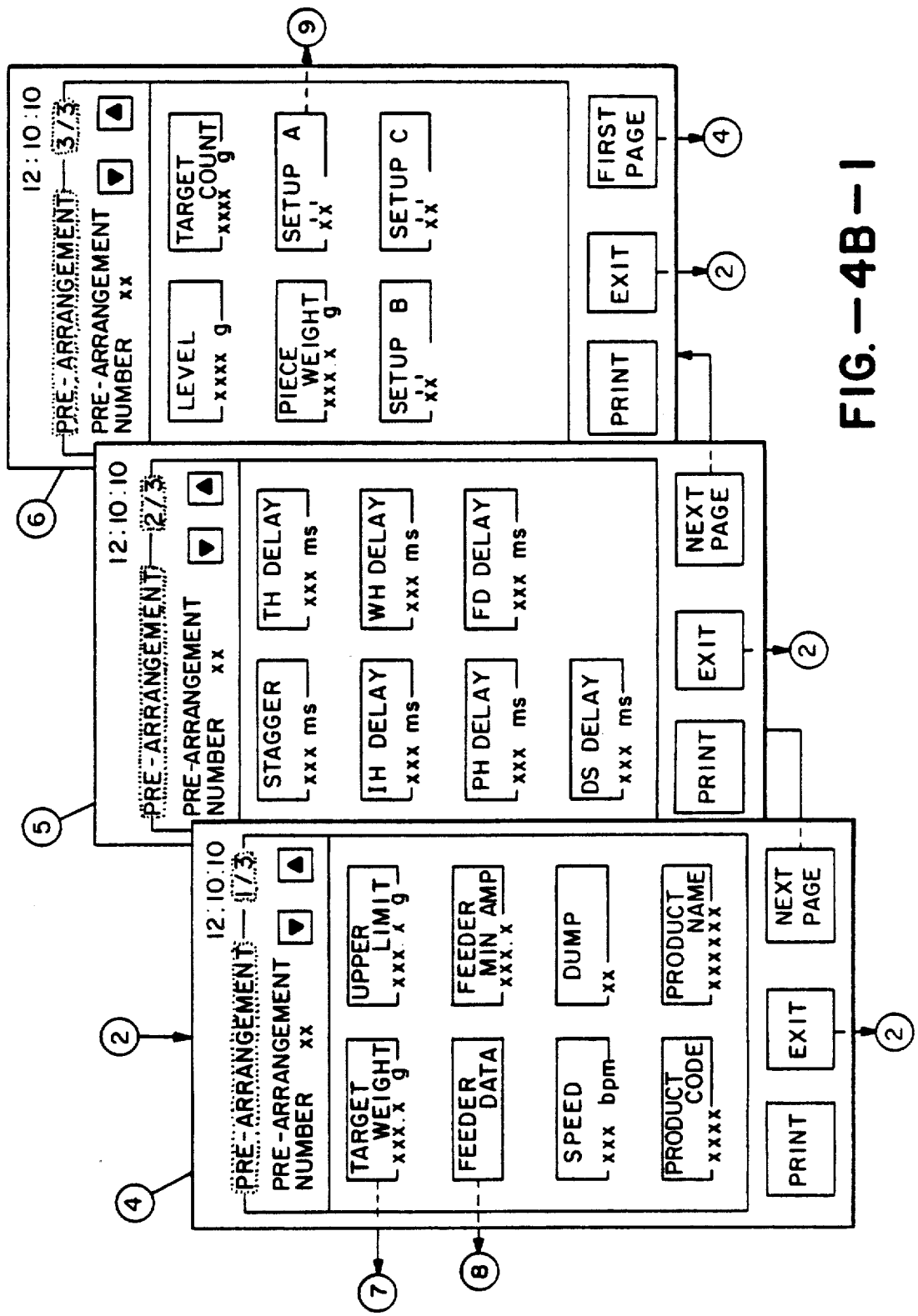
FIG.—4B—1

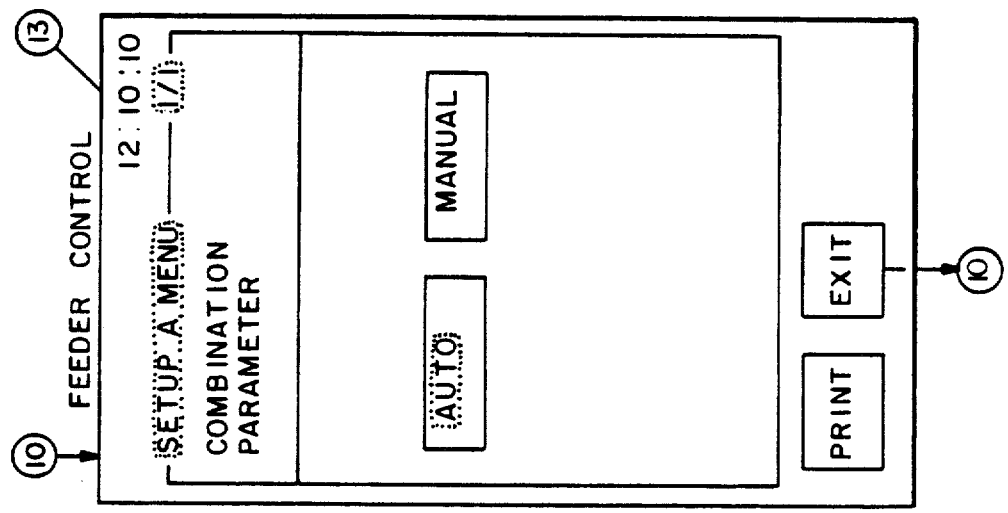
FIG.—4C—3
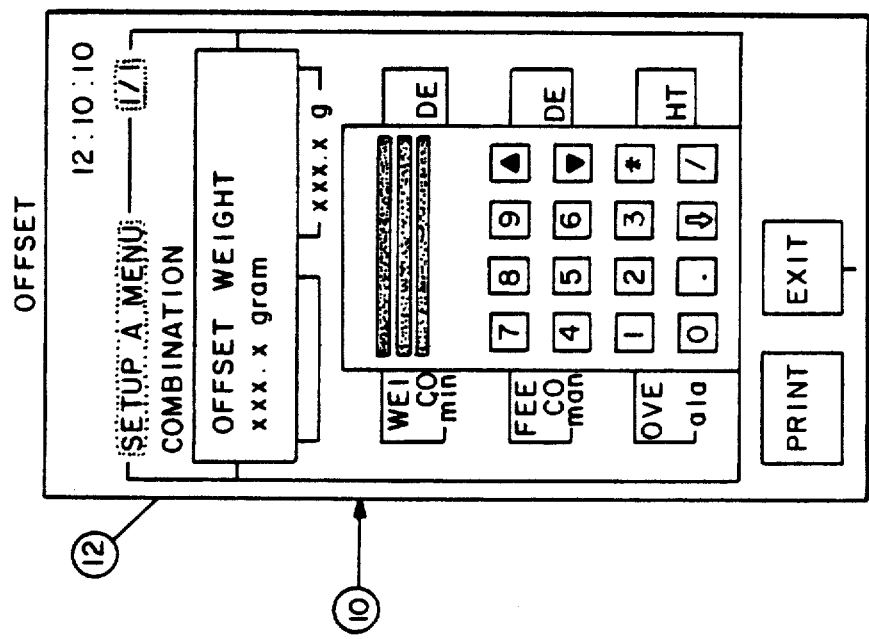
FIG.—4C—2

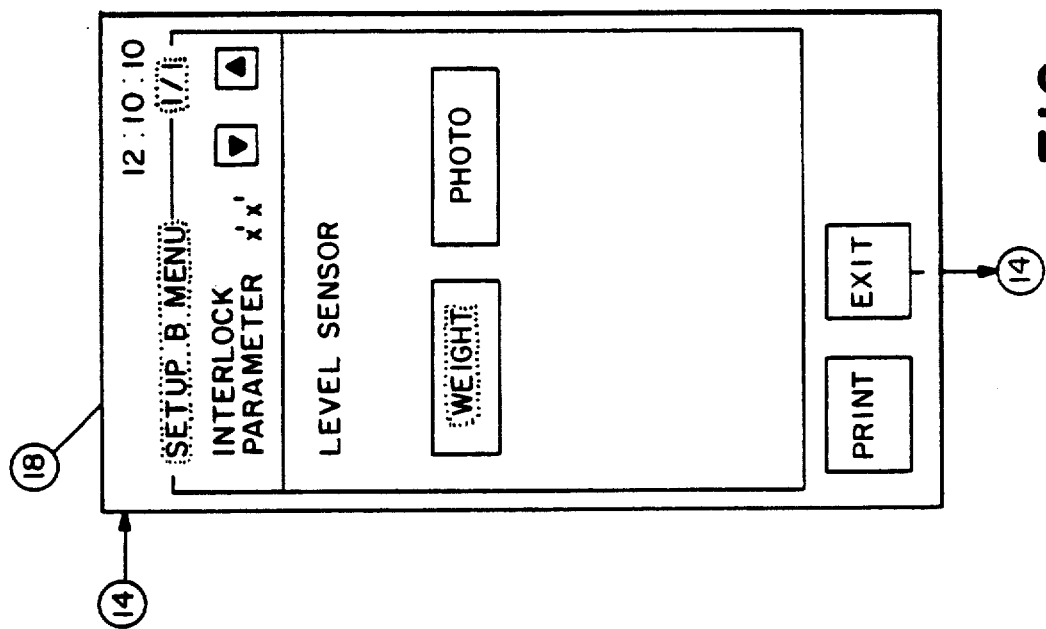
FIG.—4D—3
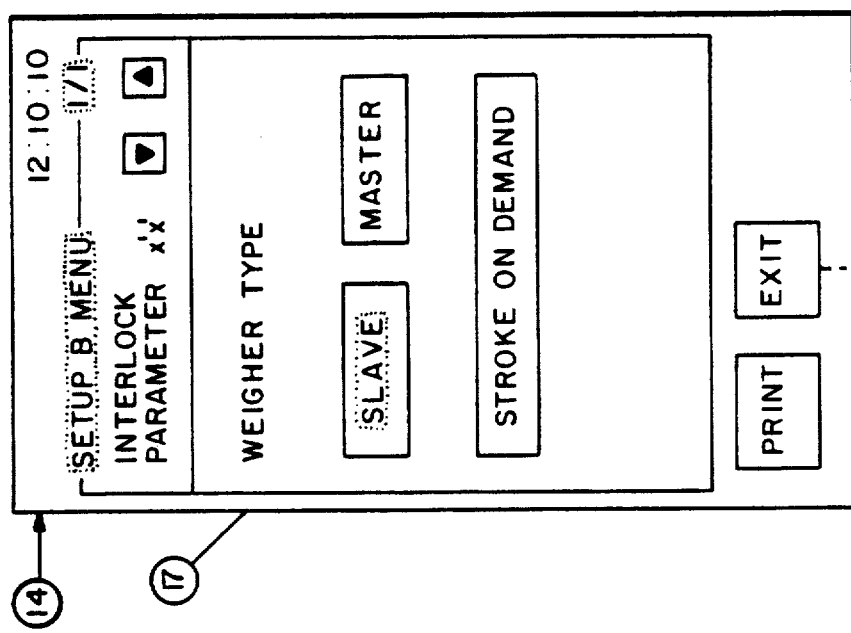
FIG.—4D—2

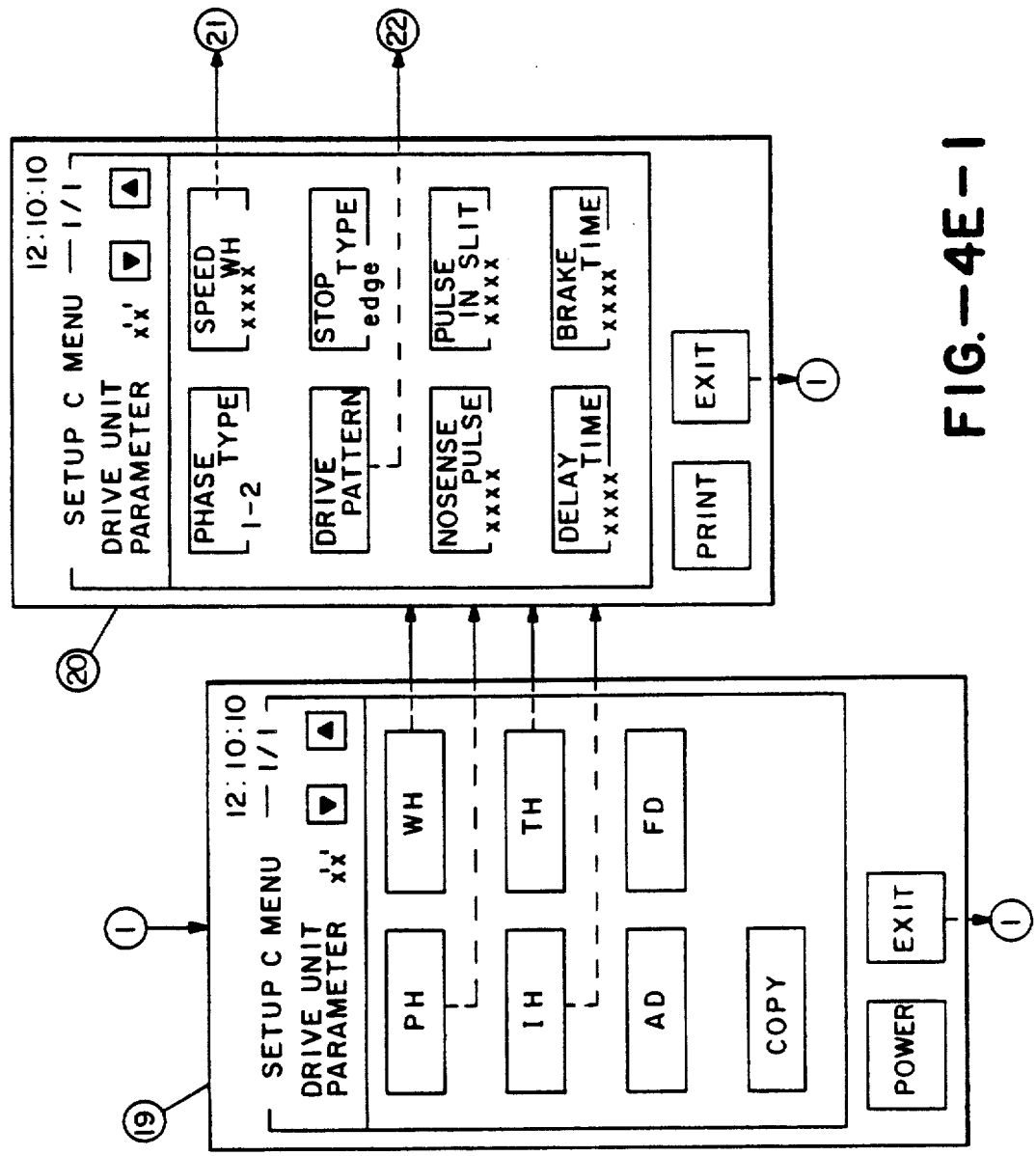
FIG.—4E—1

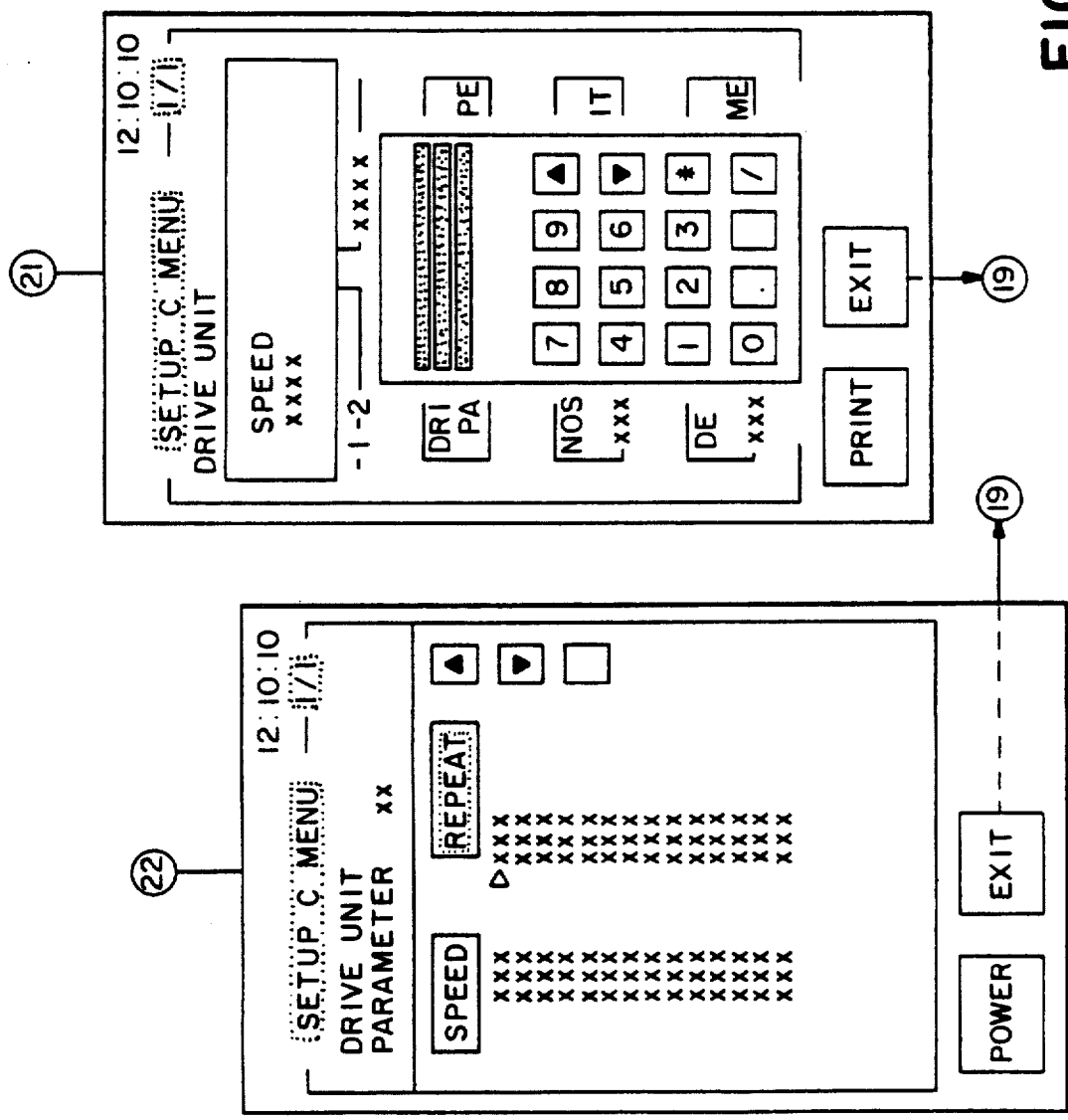

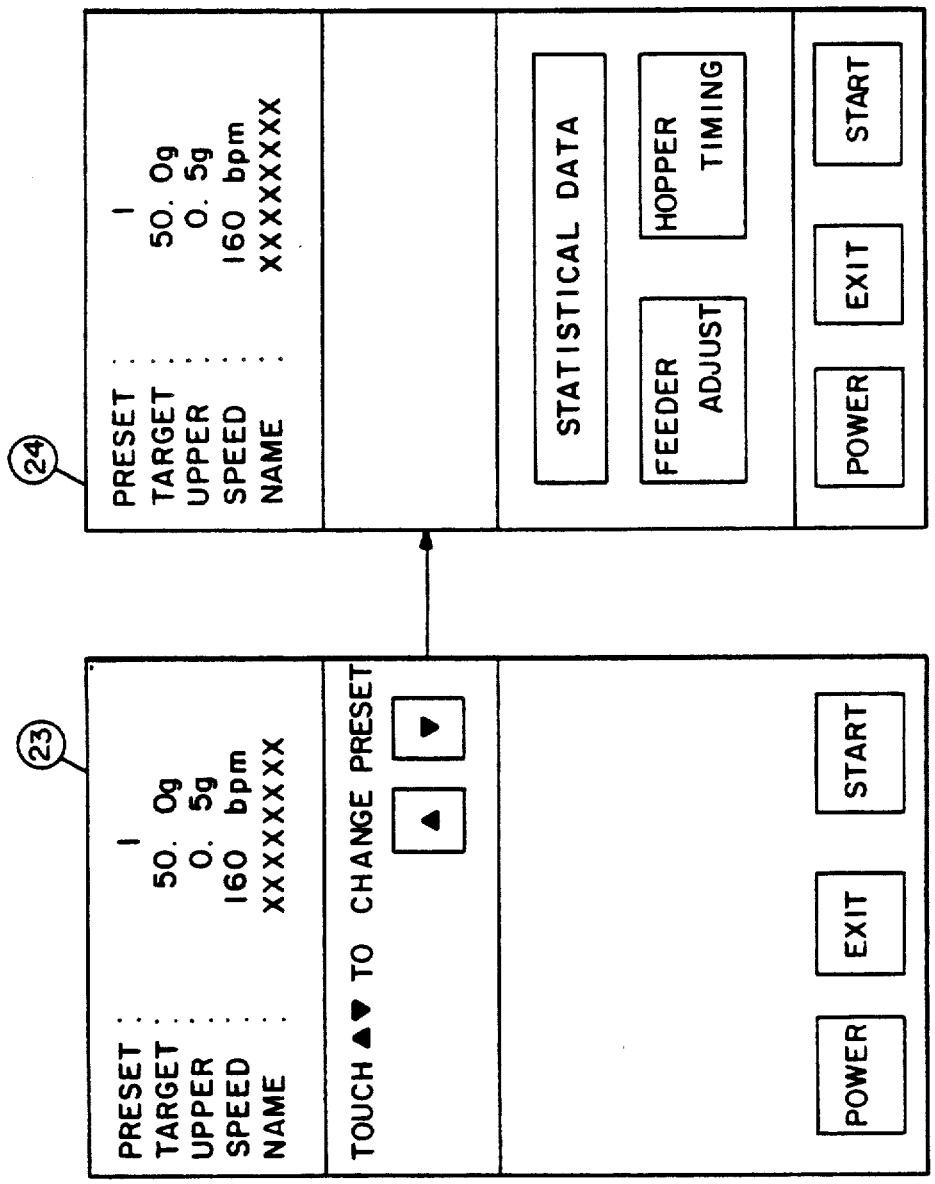

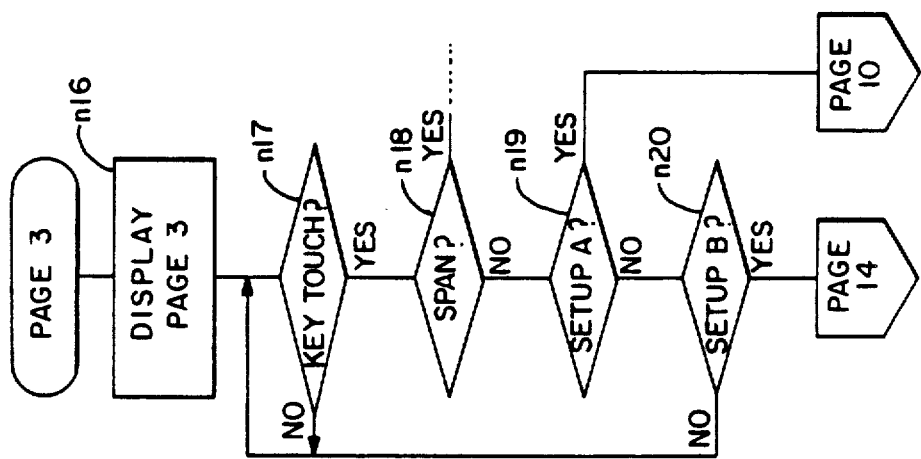
FIG.—5A-4
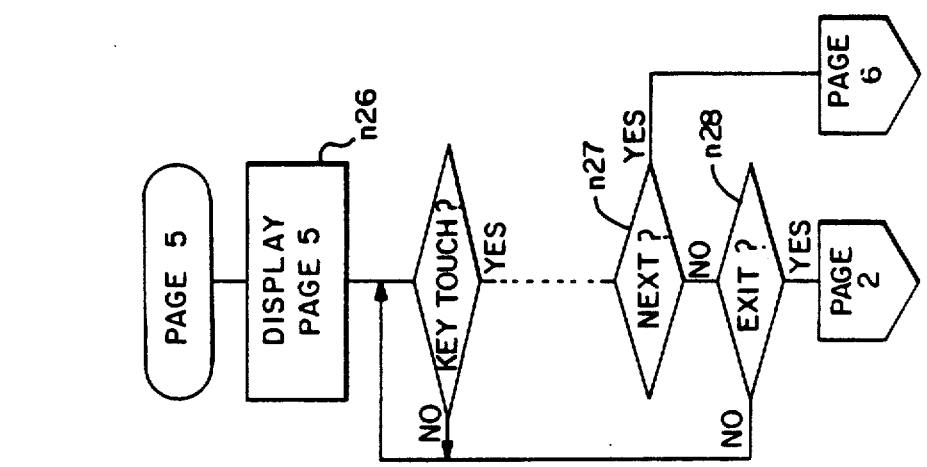
FIG.—5B-2
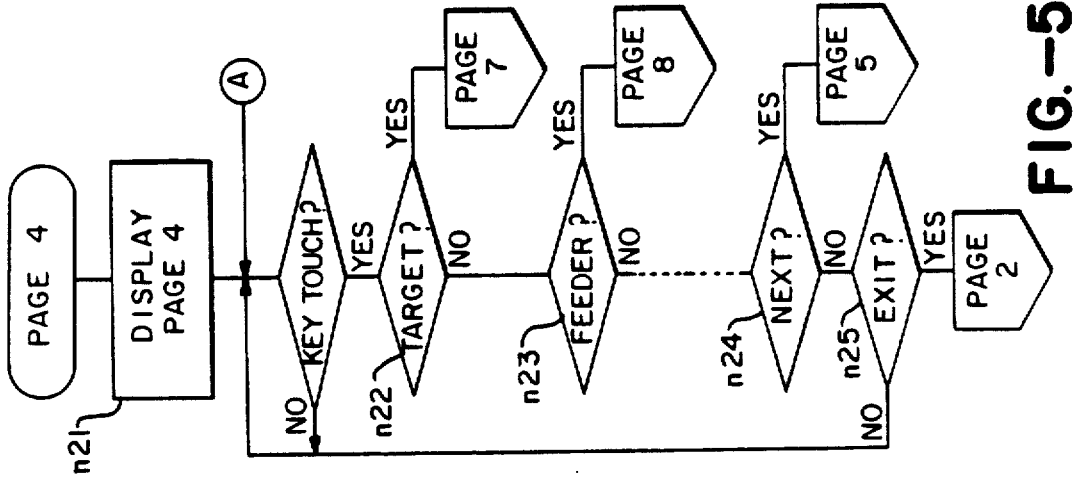
FIG.—5B-1

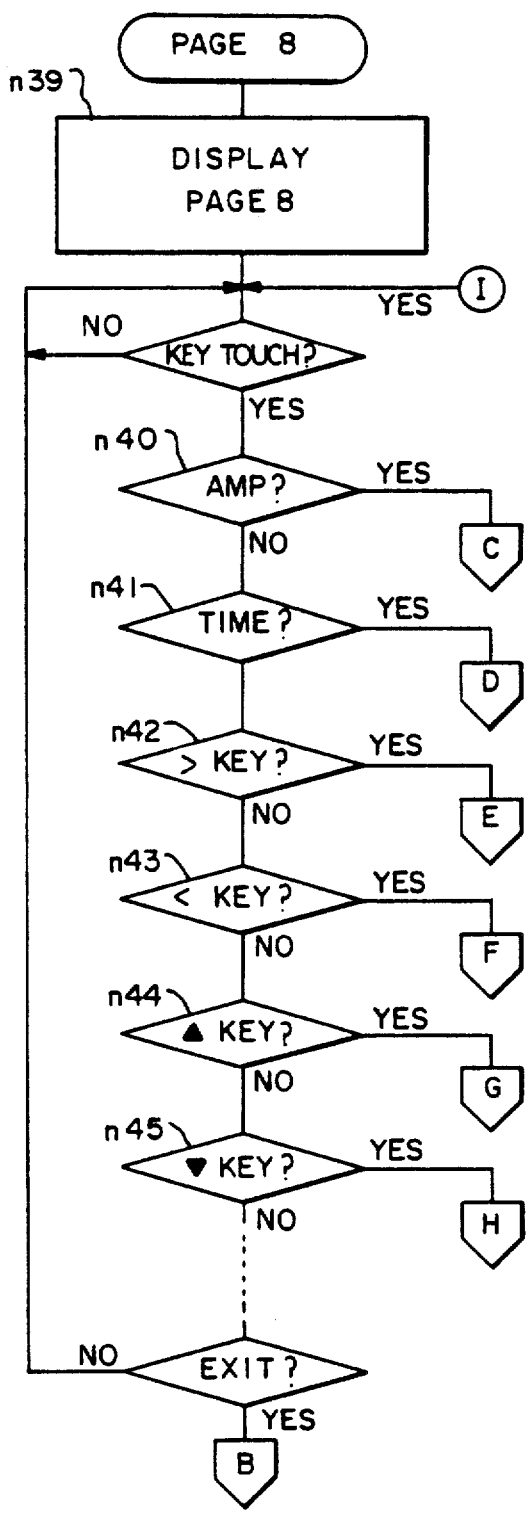
FIG.—5C—1
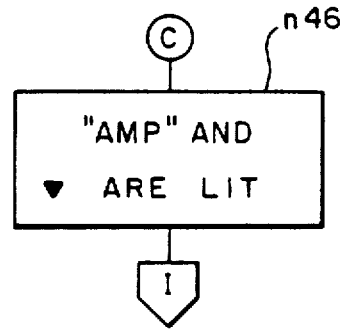
FIG.—5C—2
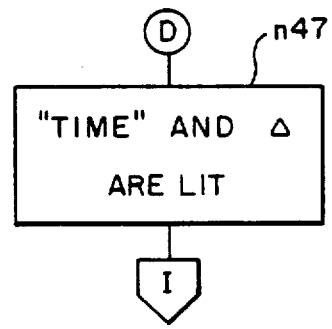
FIG.—5C—3

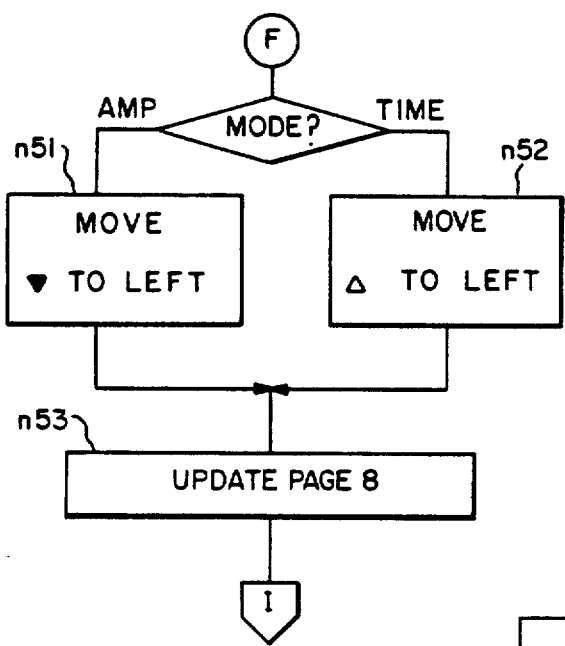
FIG.—5D—1
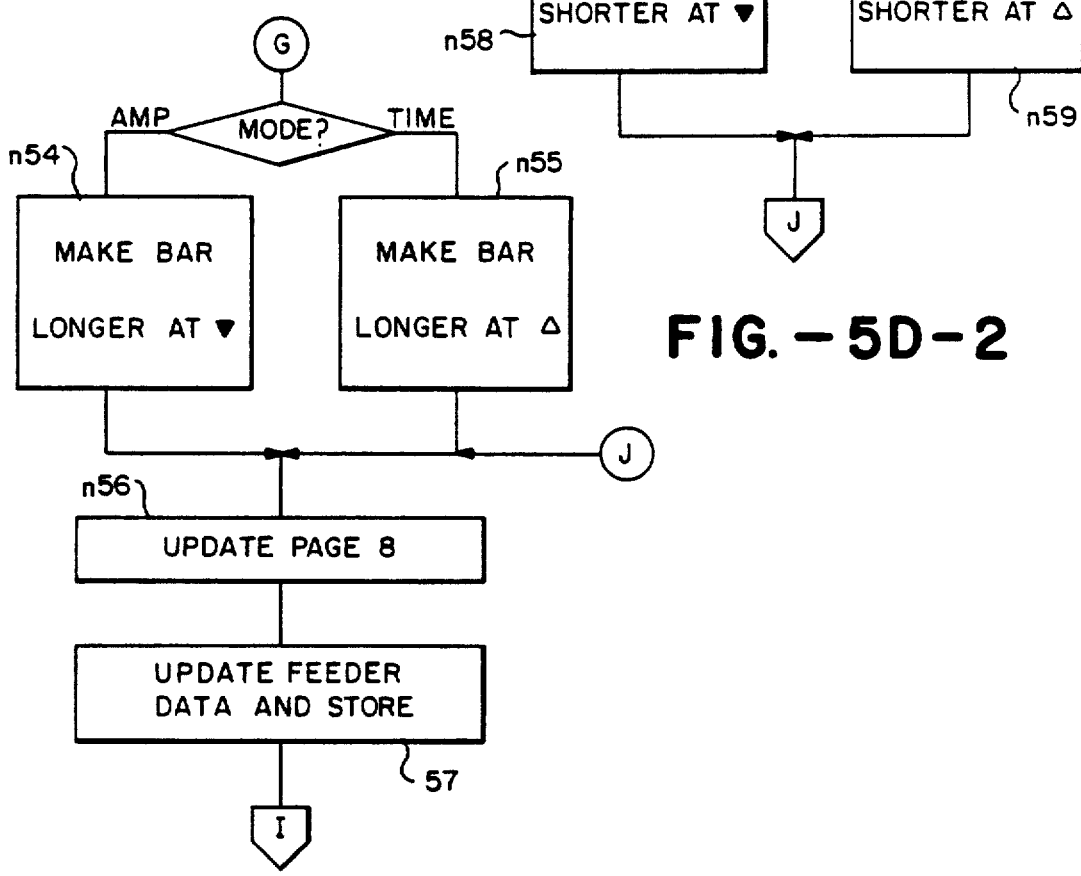
FIG.—5D—2
FIG.—5D—3

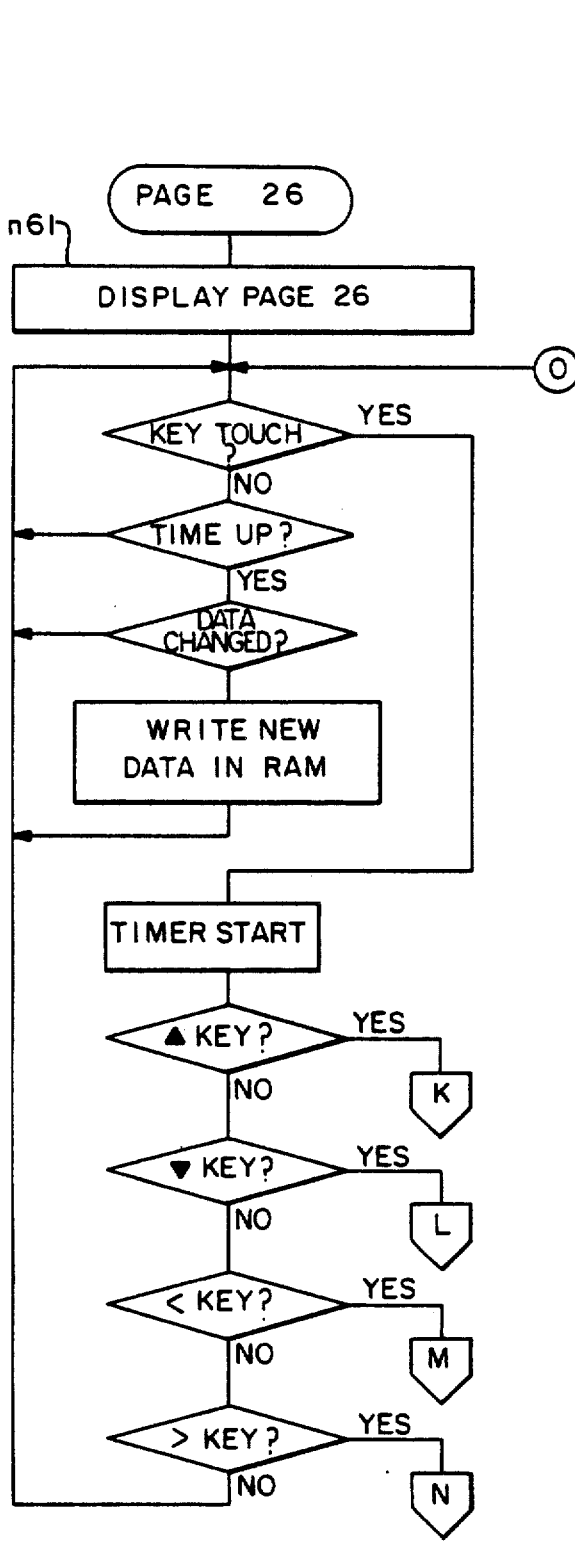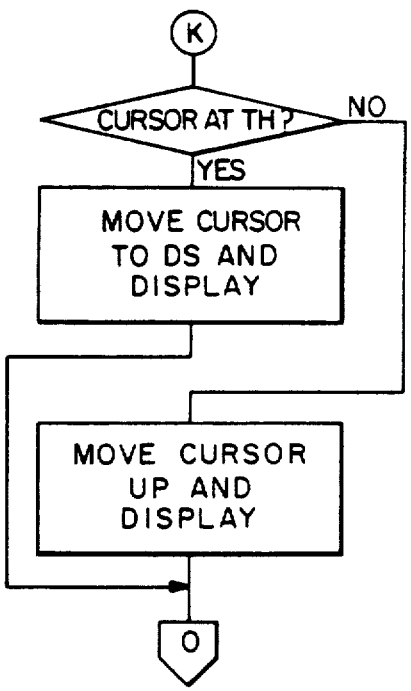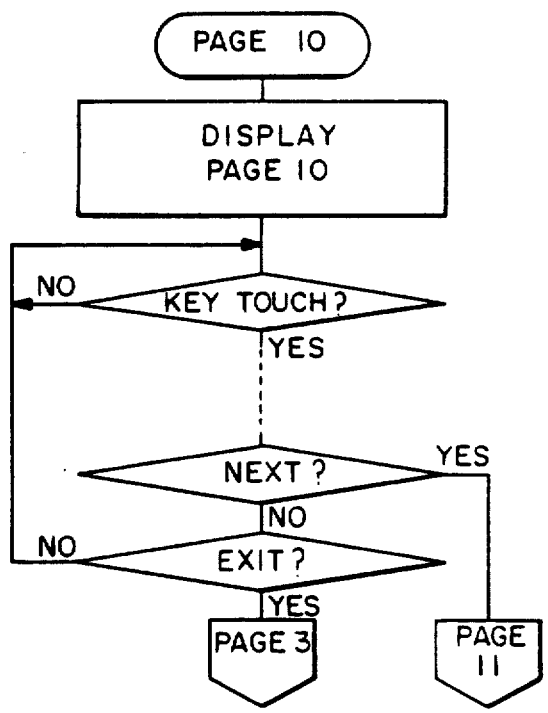
FIG.-5F-1  FIG.-5F-2  FIG.-5D-4

METHOD OF SYSTEM OPERATION

This is a division of Pat. application Ser. No. 931,230 filed Nov. 14, 1986 now Pat. No. 4,811,256.

BACKGROUND OF THE INVENTION

This invention relates to an input-output method and device for an operating system and more particularly to a method and device whereby a user can easily and efficiently select and modify operating conditions of a combinational weighing system.

Combinational weighing means weighing articles by a plurality of weighing devices, performing arithmetic operations for combinations of measured weight values and then selecting a combination according to a predefined criterion. The major features of combinational weighing are great accuracy and high throughput. Automatic weighing systems of a combinational weighing type developed and manufactured by the present assignee, for example, have been commercially available for many years. A typical combinational weighing system is comprised of a plurality of article batch handling units arrayed radially in a circular formation and articles to be weighed are transported by a conveyor and dropped onto a centrally located dispersion feeder which distributes them among the individual article batch handling units. Each article batch handling unit includes a pool hopper for holding an article batch temporarily and a weigh hopper wherein the article batch is weighed by means of a load cell. An electrical signal indicative of the measured weight is transmitted therefrom to a computer which performs the aforementioned combinational calculation to select a combination of weights, or corresponding article batch handling units, and transmits discharge signals to the selected article batch handling units, thereby causing article batches to be discharged from these selected units.

In order to operate such a system, the user is generally required to set a number of parameters for a program written for the system computer which executes it. With the progress in relevant technologies, however, combinational weighing systems are becoming increasingly versatile and the number of data required for the operation is also increasing. The input procedure for these data becomes accordingly more complicated and troublesome. For this reason, there have been developed input-output devices and programs intended to enable even a relatively inexperienced user to efficiently make use of a great variety of functions offered by a given system. According to the input procedure disclosed in U.S. Pat. application Ser. No. 772,244 filed Sept. 3, 1985 now Pat. No. 4,694,920 and assigned to the present assignee, for example, the user can interactively select a program from a menu which appears on a display screen. For some of the programs on the menu, the user may not have to furnish a large amount of information. For running certain programs with a versatile modern system offering many choices, however, the user may be required to enter a large number of data to define the conditions under which the program is to run. In situations where it is desired to change the operating conditions of such a system with some frequency such as when many different kinds of articles are weighed out or when the same kind of articles are weighed out to different target values, the user's job to reset the operating conditions each time not only is complicated and troublesome but may also require the help of an experienced operator. Further, there is a greater risk of error and a decline of productivity when there is a large number of data to be entered.

U.S. Pat. No. 4,553,616 issued Nov. 19, 1985 to S. Haze and assigned to the present assignee discloses entering such operating conditions not singly but as a set of reserved values through a data input unit. Sets of reserved values are written into a memory means by a write control unit. When it is necessary to reset operating conditions, therefore, the user has only to read the desired conditions from the memory means, that is, as a set of reserved values.

With further advancement in the combinational weighing technology and by increasing demands from the users, the number of entries required of a user and displayed in the form, for example, of a menu has increased correspondingly. The aforementioned U.S. Pat. application Ser. No. 772,244 describes a data input program according to which the first menu, displayed after power is switched on and a title display is briefly made, contains ten items, or programs, to choose from although some of these items are not accessible to unauthorized persons who do not know the predefined password. Of the ten programs accessible from the first menu, some are relatively straightforward such as one titled "Zero Adjustment" for effecting zero-point adjustment either on all weighing devices or only on a specified one of them, depending on how the user responds, or another titled "Production" for starting a normal weighing process. There is also one titled "Prearrangement" which includes eleven sub-items according to one example, which are: (1) "Target Weight" for specifying a target weight value, (2) "Upper Limit" for defining an allowable range within which total combined weight values must fall, (3) "Feeder" for setting the vibration strength of the feeder for supplying articles to be weighed to the system, (4) "Dump Count" for setting the number of times articles are discharged from the weighers to make up the target value, (5) "Speed" for setting the number of batches discharged per minute by the system, (6) "Feed Multiplier" for setting a certain multiplier for determining the vibration mode of the article feeders, (7) "Stagger Delay" for selecting time delays with which various hoppers in each article batch handling unit are opened and closed, (8) "Level Weight" for setting the weight of articles on the dispersion feeder, (9) "Product Code" for identifying a code associated with the kind of articles being handled, (10) "Product Name" for identifying a product name, and (11) "Calculation Mode" for selecting one of available calculation modes. Similarly, the item titled "Adjustment" includes as many as fifteen sub-items and relates generally to setting any of the named sub-items. The items "Variant 1" and "Variant 2", which are for adjustments to be carried out only by a trained engineer, likewise include ten and five sub-items, respectively.

With so many items and sub-items to be considered, the user must set a great number of parameters to define an operating condition, each parameter representing one of the items or sub-items being considered. Since each parameter is generally allowed to take two or more values, the aforementioned input method by reservation numbers becomes impractical if there are too many parameters because the number of combinations of the reservation numbers increases geometrically with the number of parameters to be set, nor is it reasonable to require a large space in the memory device for storing all combinations of reservation numbers.

In view of the above, only the reservation numbers for combinations of parameters related to the sub-items in the "prearrangement" menu were stored in the memory device of a prior art system, necessitating the user to directly and singly set the other parameters related to the sub-items in the "Adjustment", "Variant 1" and "Variant 2" menus. As mentioned above, however, this means that the user must repeatedly reset these sub-items as changes are made in operating conditions. Moreover, the entire operation must be stopped in the case of prior art combinational weighing systems whenever an operating condition is changed, for example, to adjust the timing delay between the opening of hoppers in an article batch handling unit. In other words, the user of prior art systems could not make such adjustments while watching the operating conditions on a display means, and the system often had to be started and stopped many times to effect adjustments.

SUMMARY OF THE INVENTION

It is therefore an object of the present invention to provide an input-output method and device for an operating system such as a combinational weighing system by means of which a large number of parameters each representing an operating condition of the system can be set and/or reset efficiently without requiring a large space in memory means.

It is another object of the present invention to provide such an input-output method and device with which the operating condition can be changed while the system is in operation.

It is still another object of the present invention to provide an input-output device which displays currently set values of parameters as a bar graph or other graphic symbol on a screen or other display media and by means of which these values can be changed easily by touching the screen or other such media.

The above and other objects of the present invention are achieved by providing a touch screen with a graphic display controller and an input computer which is programmed independently of the main computer for controlling the overall operation of the weighing system. Of the large number of parameters which must be set and entered for the system operation, some combinations can usually be found which frequently take the same set of values such as a group of parameters related to the interconnection of the weighing system to an accessory bag maker. Values of parameters in such combinations are not individually stored but stored as a group and frequently appearing combinations of values of these parameters are assigned "reservation numbers" so that these values can be set as a group by specifying one of these reservation numbers. Values of certain parameters are displayed as a bar graph, the length of each bar representing the value of a parameter. Setting and resetting of such parameters can be efficiently carried out by moving a cursor on the display screen to the position of the bar representing the parameter of interest and changing the length of the bar by touching a key displayed on the same touch screen.

BRIEF DESCRIPTION OF THE DRAWINGS

The accompanying drawings, which are incorporated in and form a part of the specification, illustrate an embodiment of the present invention and, together with the description, serve to explain the principles of the invention. In the drawings.

DETAILED DESCRIPTION OF THE INVENTION

Figures 1, 4A:
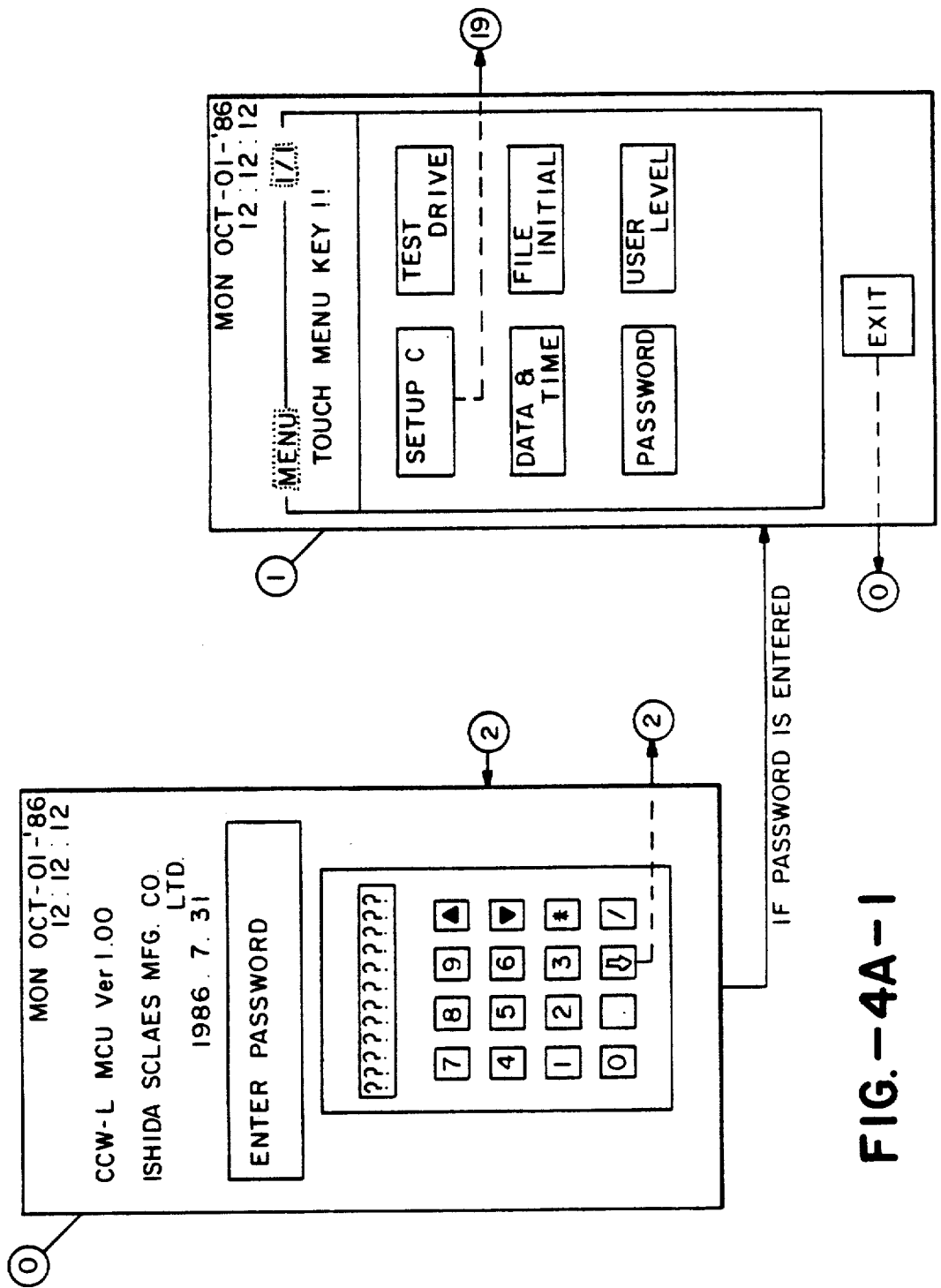
FIG. 1 is a side elevational view of a principal part of a combinational weighing system which can incorporate the method and device of the present invention.

In FIG. 1, there is shown a side elevational view of a principal part of a combinational weighing system 10 which can incorporate the method and device of the present invention. This system 10 has eighteen article batch handling units radially arrayed in a circular formation and the articles to be weighed are transported by a conveyor means (not shown) and dropped onto a dispersion feeder (DF) 12 which is a circular table with a lightly inclined conical top surface so that the articles dropped thereonto from the conveyor means are dispersed uniformly in radial directions. Eighteen feed troughs (or radial feeders RF) 13 each with an article receiving end and an article delivering end are arranged in a circular formation around the dispersion feeder 12 with their article receiving ends adjacent thereto. Both the dispersion feeder 12 and the radial feeders 13 are supported on a system housing 15 preferably through individual vibration-causing means (not shown) which serve to cause vibrational motion of the articles thereon. The radial feeders 13 are disposed radially and serve to deliver the articles to be weighed into the individual article batch handling units associated therewith. Each article batch handling unit includes a pool hopper (PH) 17 serving to receive an article batch from the radial feeder 13 associated with the same article batch handling unit and to discharge the same article batch into a weigh hopper (WH) 18 belonging to the same article batch handling unit and situated immediately therebelow. A weigh hopper 18 is connected to a weighing device (not shown in FIG. 1) such as a load cell (LC) and serves momentarily to hold the article batch received from the pool hopper 17 thereabove. The weight values measured by the load cells are electrically transmitted to a control unit (not shown in FIG. 1). The lower part of the system 10 is comprised of a chute assembly, including a funnel-shaped outer chute 20 coaxially surrounding a funnel-shaped inner chute 21 in such a way that they form two separate discharge routes. At the bottom end, the outer chute 20 is divided into two separate passages where it is connected to left-hand and right-hand timing hoppers (TH) 24 which are, in turn, connected to a first lower chute 25. At the bottom of the inner chute 21 is provided a second timing hopper 27 which is connected to a second lower chute 28. The timing hoppers 24 and 27 are intended to make certain that the groups of article batches sequentially discharged through the same chute are separated, thus contributing to improvement of system reliability.

Figures 2, 4A:
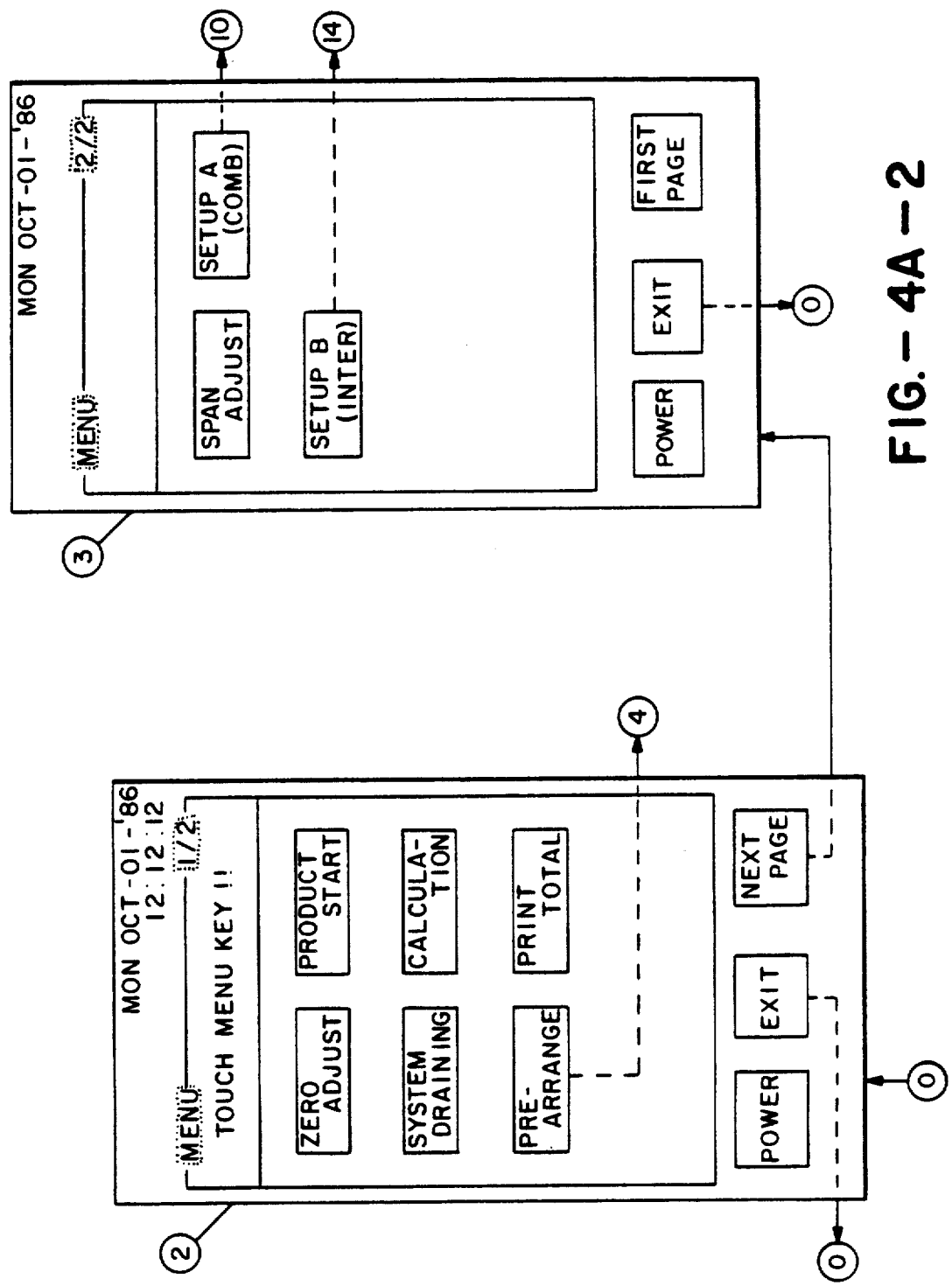
FIG. 2 is another chute assembly for the combinational weighing system of FIG. 1.
Figures 2, 4B:
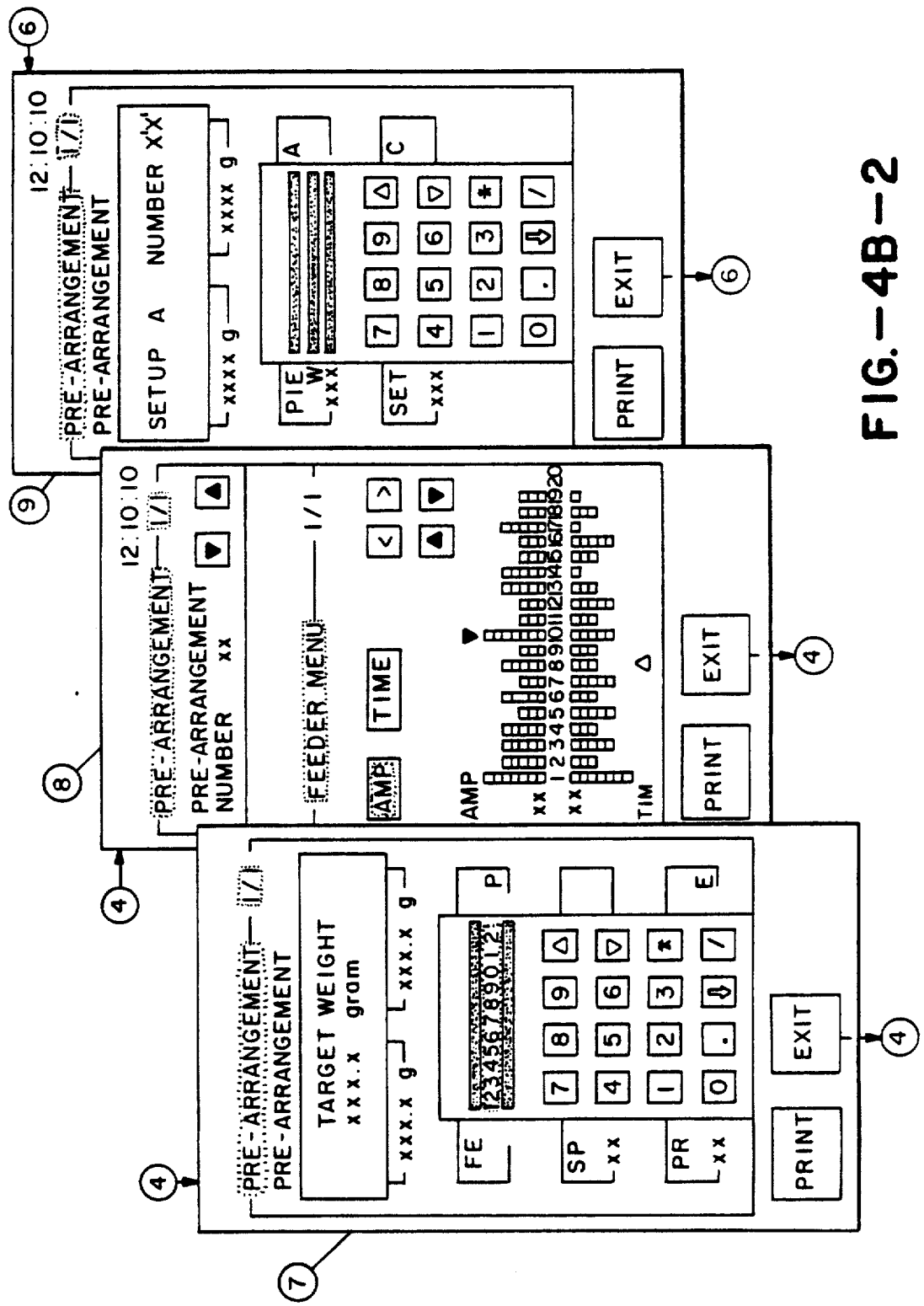
Figures 1, 4C:
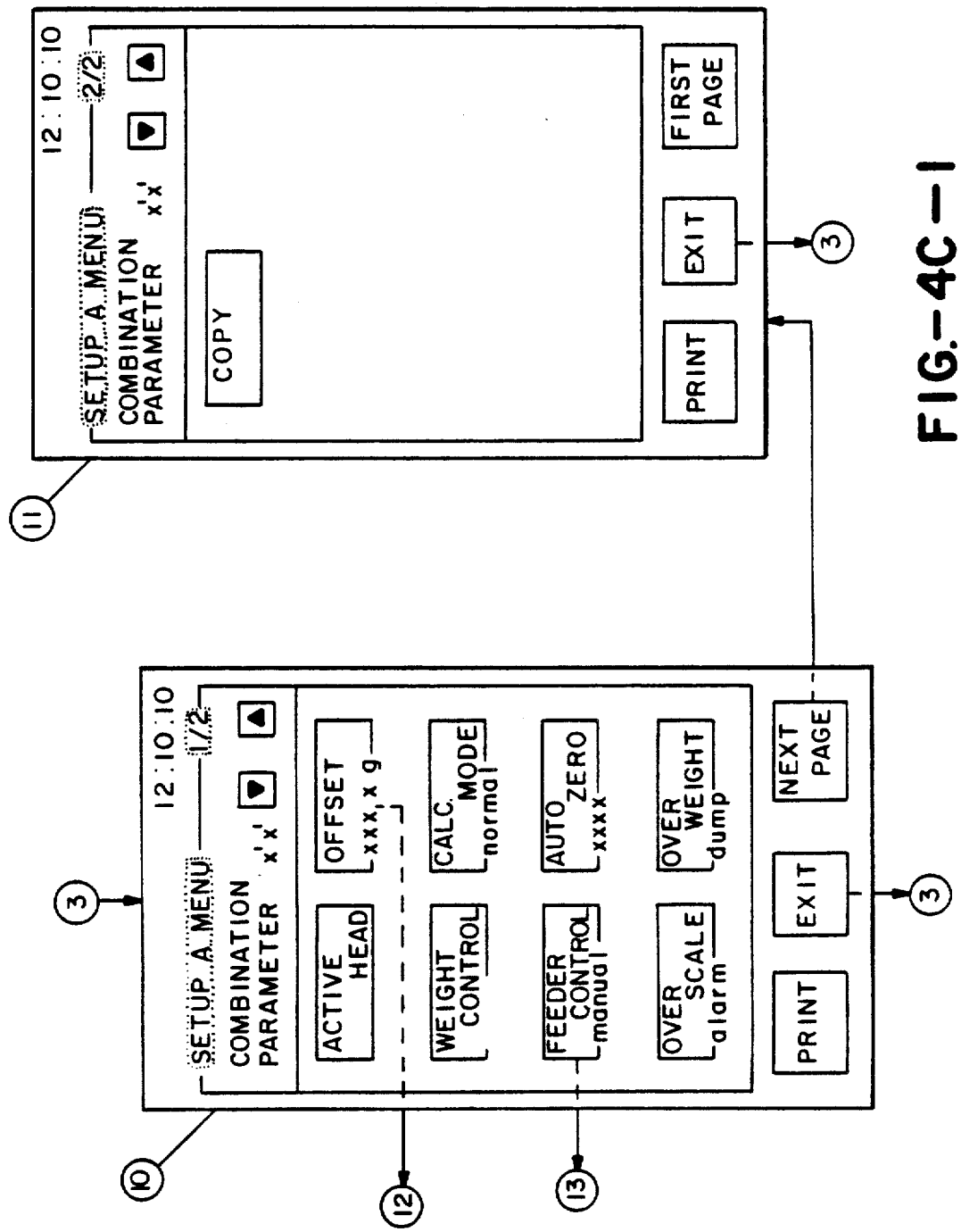
Figures 1, 4D:
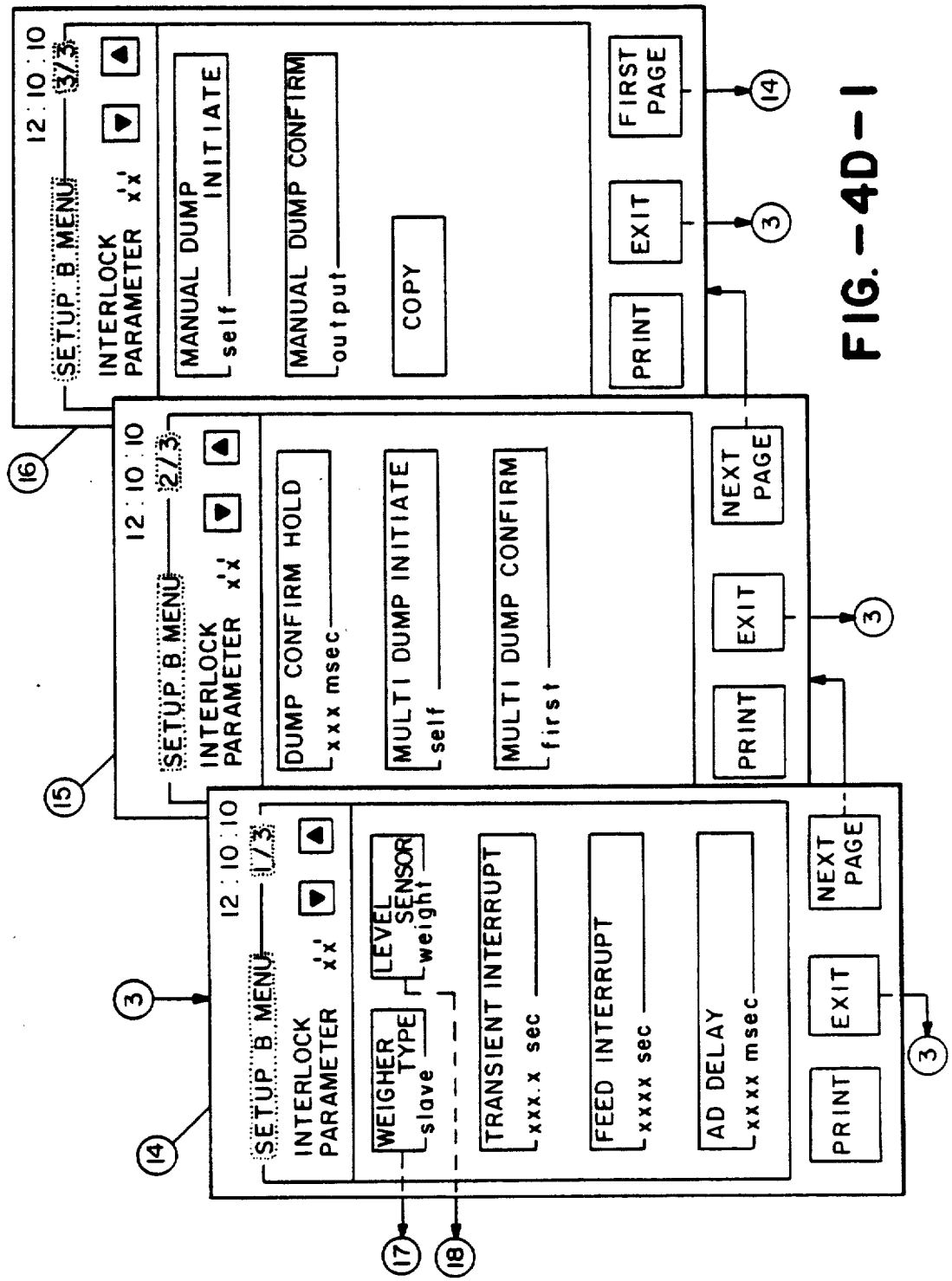

FIG. 2 shows a chute assembly of another type characterized as having a funnel-shaped inner chute 31 and two completely separated outer chutes 32 and 33, and they are so structured that article batches discharged into the left-hand chute 32 are collected temporarily inside a first intermediate hopper (IH) 41, those discharged into the inner chute 31 are collected similarly inside a second intermediate hopper 42 and those discharged into the outer right-hand chute 33 are collected inside a third intermediate hopper 43. Methods of operating these intermediate hoppers 41, 42 and 43 are disclosed in U.S. Pat. application Ser. No. 787,325 filed Oct. 15, 1985 and assigned to the present assignee.

Conditions for operating the combinational weighing system 10 of FIG. 1 are set or reset through an input-output device (not shown in FIG. 1) which may include a touch screen of a known type, for example, disclosed in Japanese Pat. Publication Kokoku 61-35569 and made commercially available by Matsushita Electric, Inc. of Osaka, Japan.

Figure 3:
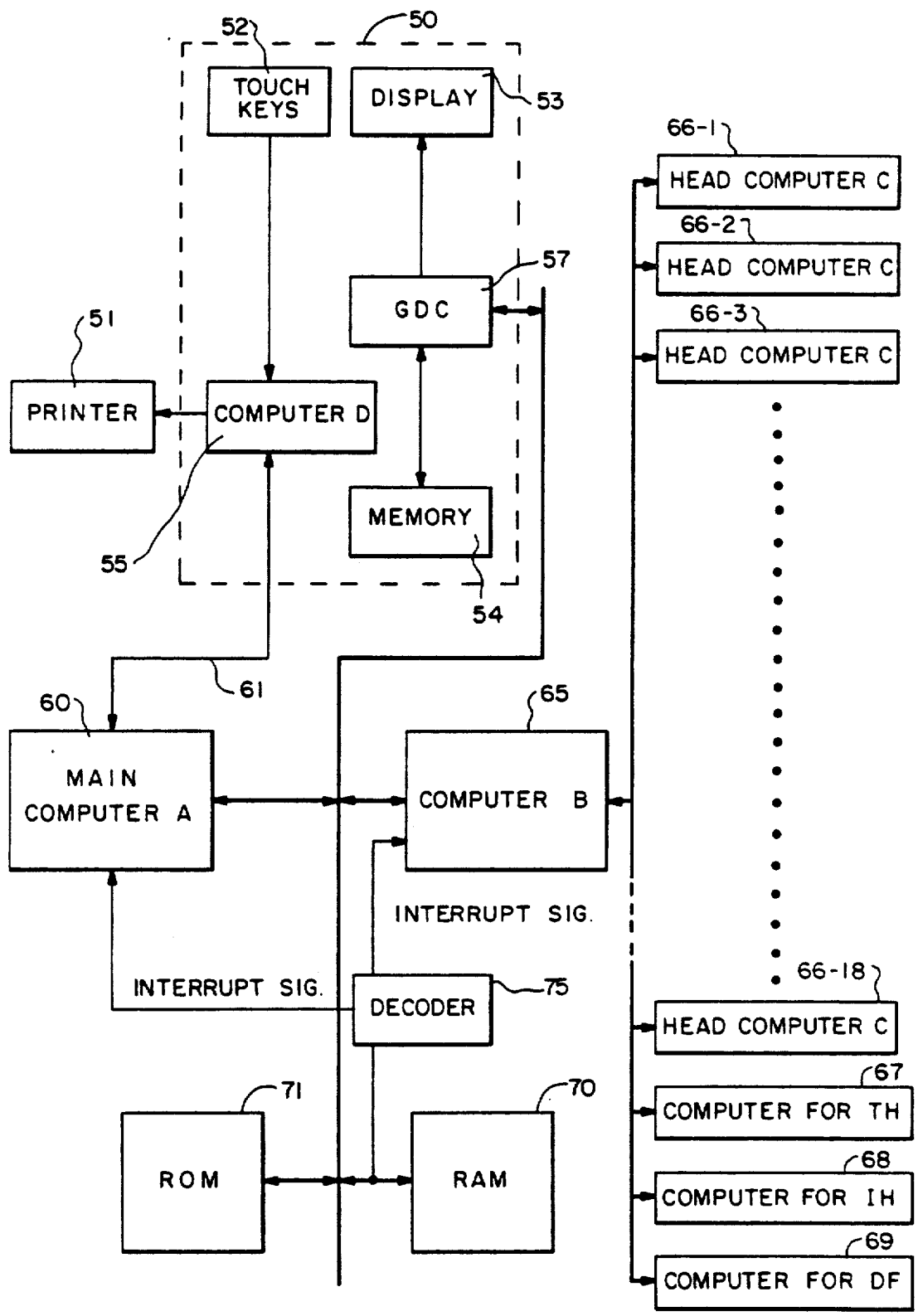
FIG. 3 is a block diagram of a control system for the weighing system of FIG. 1 inclusive of an input-output device embodying the present invention, FIGS. 4A-1, 4A-2, 4B-1, 4B-2, 4C-1 through 4C-3, 4D-1 through 4D-3, 4E-1, 4E-2, 4G and 4H, which are hereinafter all together referred to as FIG. 4, show displays made on the touch screen of FIG. 3, and FIGS. 5A-1 through 5A-4, 5B-1 through 5B-4, 5C-1 through 5C-4, 5D-1 through 5D-4, 5E, 5F-1 through 5F-3, 5G-1 and 5G-2, which are hereinafter all together referred to as FIG. 5, show flow charts of a program by which operating conditions are set or reset through the control system of FIG. 3.

FIG. 3 is a block diagram of a control unit for the entire weighing system 10 including the aforementioned input-output device with a touch screen 50 and a printer 51. Numeral 60 indicates a computer (hereinafter referred to as "main computer A") which serves to control the operation of the entire system. The touch screen 50 includes touch keys 52, a plasma display unit 53 and a memory device 54 which stores display data of various "pages" (to be explained in detail below). Numeral 55 indicates a computer (hereinafter referred to as "computer D") which controls the touch keys 52, the printer 51 and input from and output into an external memory means such as a memory card (not shown). Numeral 57 indicates a graphic display controller (GDC) which reads out display data of a specific page from the memory device 54 in response to a signal from the main computer A 60, converts them into video signals and transmits them to the display unit 53. The GDC 57 also serves to accept screen data transmitted from the main computer A and write it in a specified page stored in the memory device 54. The main computer A 60 is connected to the computer D 55 by a photocable 61 and serves to control the input and output of the touch screen 50 by interpreting the operating conditions received in the form of key code from the computer D 55 and the currently displayed conditions. If the display must be changed, the main computer A 60 transmits updated display data to the GDC 57.

Numeral 65 indicates a computer (hereinafter referred to as "computer B") which carries out combinational calculation. Each article batch handling unit (or head) has associated therewith a computer (hereinafter referred to as "head computer C") 66-1, 66-2,...66-18. Individual computers 67, 68 and 69 are also provided to control the timing hoppers 24 and 27, intermediate hoppers 41, 42 and 43 and the vibratory motion of the dispersion feeder 12, respectively. Weight signals indicative of the weights of article batches communicated from the individual load cells are transmitted through the head computers C 66 to the computer B 65 and combinational calculations based on the weight values indicated by these weight signals is carried out by the computer B 65. Numeral 70 indicates a RAM for storing messages and data for communication between the main computer A 60 and the computer B 65. Programs for all these computers are stored in a ROM 71 and transmitted to the individual computers when power is initially switched on. Whenever changes in operating conditions for the system are entered through the touch screen 50, irrespective of whether the system is then in operation, new conditions are written in the appropriate places in the RAM 70 and an interrupt signal is transmitted from a decoder 75 and received by the computer B 65. The computer B 65, upon receiving such an interrupt signal from the decoder 75, writes the new operating condition in its internal memory device (not shown) and replaces the old conditions thereby. The new operating conditions are thereafter communicated to the head computers C 66 as well as to the computers 67, 68 and 69 when discharge signals are transmitted to selected article batch handling units. In other words, operating conditions according to the present invention can be changed in each cycle of the combinational calculation, that is, without stopping the overall operation of the system.

In return, when weight values or error messages which are to be displayed by the display unit 53 are received by the computer B 65, the decoder 75 transmits an interrupt signal to the main computer A 60. The main computer A 60 then stores such data or error messages in its internal memory device, generates necessary display data and transmits them to the GDC 57.

Next, before a specific example of a program according to the present invention is described for the computer D 55, the basic principle of the present invention by which such a program is created will be explained. To briefly review the problem which is intended to be solved by the present invention, the prior art system described above displays menus such that the user can select therefrom a program to run as well as conditions under which the selected program should be run. In the case of an example illustrated above, however, the user must set values for parameters corresponding to 15 sub-items in the "Adjustment" menu, 10 sub-items in the "Variant 1" menu and 5 sub-items in the "Variant 2" menu. Previously, setting of parameters had to be done individually and the procedure was found to be too complicated and troublesome. It was therefore considered desirable to store combinations of conditions or parameters as sets of reserved values in a memory means but the problem thereby encountered was that it would require unreasonably large memory space in view of the large number of parameters which must be specified.

The procedure of this invention is based on the observation that same sets of values occur more frequently for certain combinations of parameters. Let us consider a following simplified situation with ten parameters A, B,... J which must be set to operate a system. Let us further assume that, of these ten parameters, A, B, C, D and E are usually changed if a different target weight value is selected although articles of the same kind are weighed (such as weighing out 100 g of peanuts and 200 g of peanuts) but that F, G, H, I and J usually do not have to be changed even if the target weight value is changed as long as articles of the same kind are being handled. In such a situation, combinations of parameters which may be written symbolically as (A, B, C, D, E=1; F, G, H, I, J=1), (A, B, C, D, E=2; F, G, H, I, J=1), and (A, B, C, D, E=3; and F, G, H I J=1) will occur frequently for three different target weight values for articles of one type, while combinations (A, B, C, D, E=4; F, G, H, I, J=2), (A, B, C, D, E =5; F, G, H, I, J=2) and (A, B, C, D, E=6; F, G, H, I, J=2) will likewise occur frequently for three different target weight values for articles of another type. In other words, it is frequently the case that the combination of parameters F, G, H, I, J=1 usually appears when articles of the first type are weighed out irrespective of the target weight value, while the combination F, G, H, I, J=2 usually appears when articles of the second type are weighed out, and so on. In such a typical situation, it is convenient to consider the five parameters F, G, H, I and J as a single set. Let SETUP be the "name" of this set, and the six combinations considered above may be rewritten as follows: (A, B, C, D, E=1; SETUP 1), (A, B, C, D, E=2; SETUP 1), (A, B, C, D, E=3; SETUP 1), (A, B, C, D, E=4; SETUP 2), (A, B, C, D, E=5; SETUP 2) and (A, B, C, D, E=6; SETUP 2). The net effect of grouping the five parameters F, G, H, I and J into one single combination called SETUP is to reduce the required storage space in the memory means.

In accordance with the general principle stated above, the sub-items in the menus titled "Adjustment", "Variant 1" and "Variant 2" for the aforementioned prior art system are divided into three groups titled SETUP A, SETUP B and SETUP C according to a program embodying the present invention illustrated hereinbelow. SETUP A includes conditions related to operation and weighing SETUP B includes conditions related to the connection of the system with peripheral devices such as a packaging unit and a bucket conveyor. SETUP C includes conditions related to the hardware such as stepping motors used in the individual article batch handling units to open and close hopper gates. Thus, conditions within each group (SETUP) are closely related and hence it is frequently the case that same sets of values are chosen.

Next, there is illustrated a program which is based on the principle generally described above and by which the computer D 55 sets or resets operating conditions for the system in response to a user input through the touch keys 52. The program is illustrated by way of both a series of displays made on the display unit 53 as shown in FIG. 4 and a flow chart in FIG. 5.

Figures 1, 2, 3, 5A:
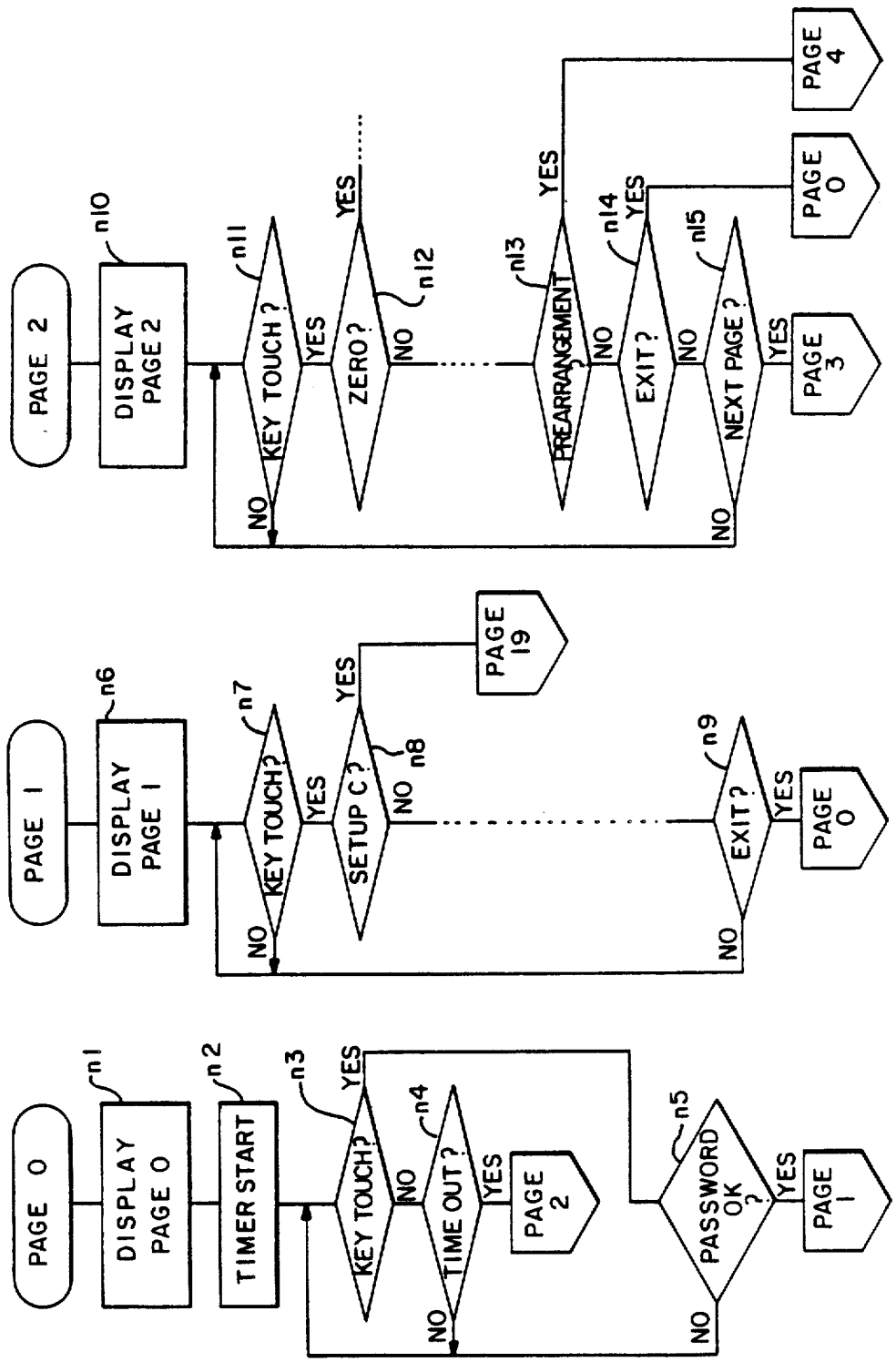
Figures 3, 4, 5B:
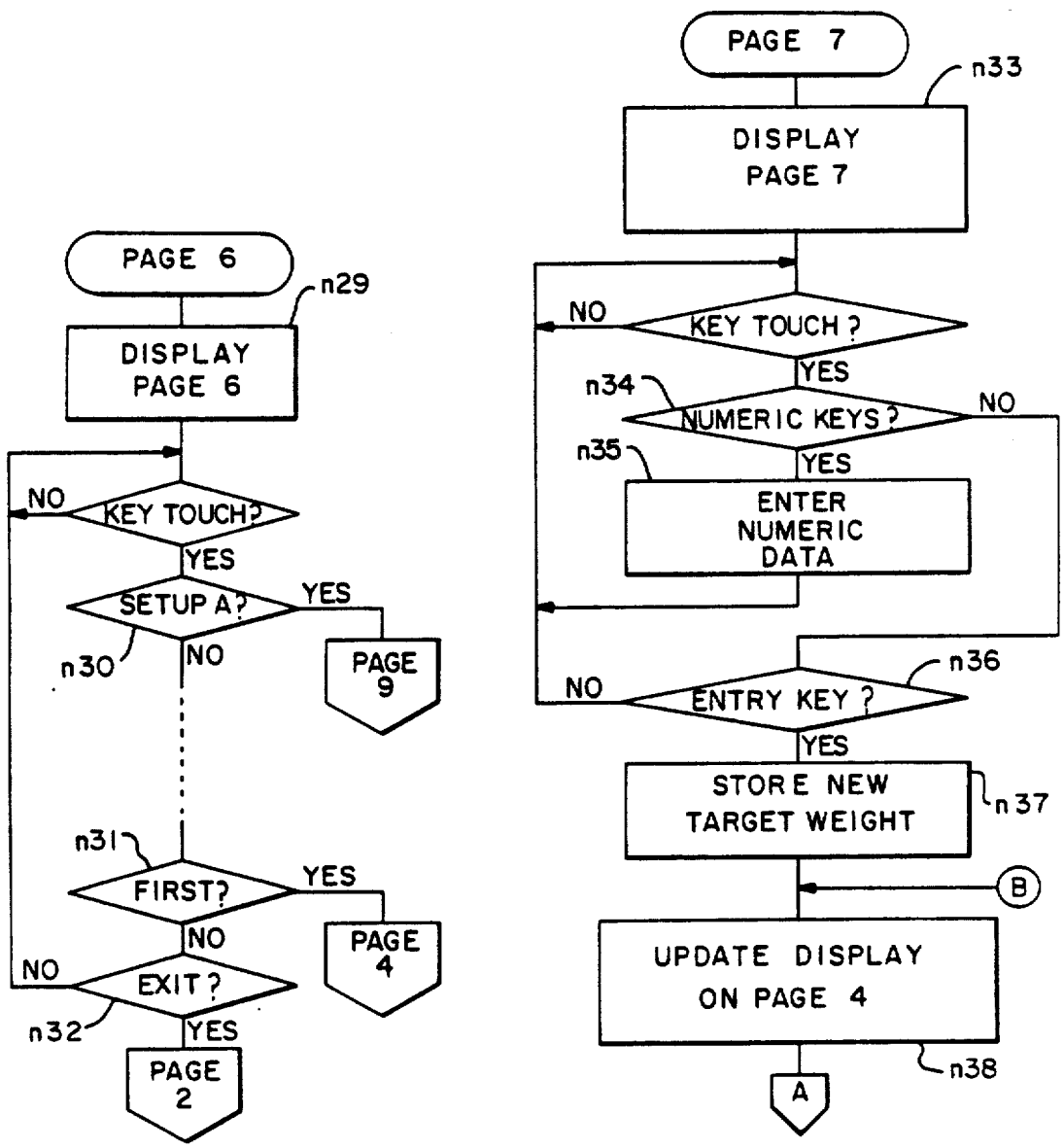
Figures 4, 5C:
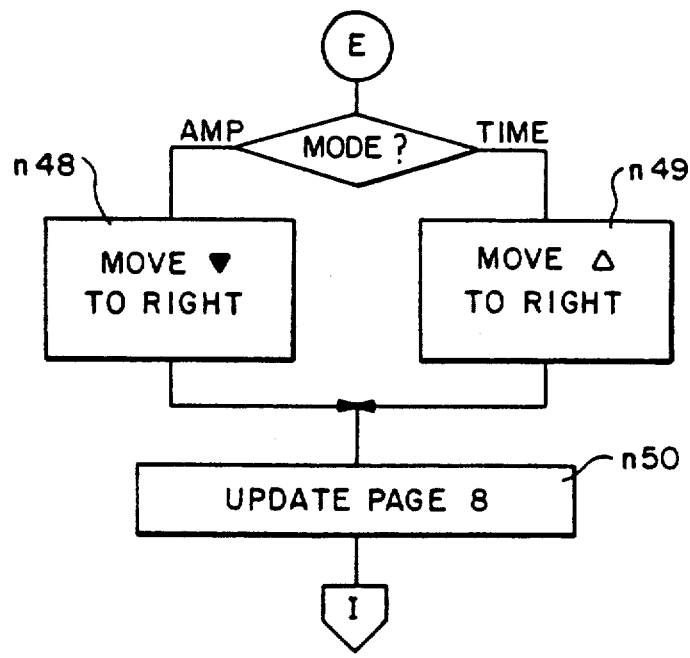
Figure 4G:
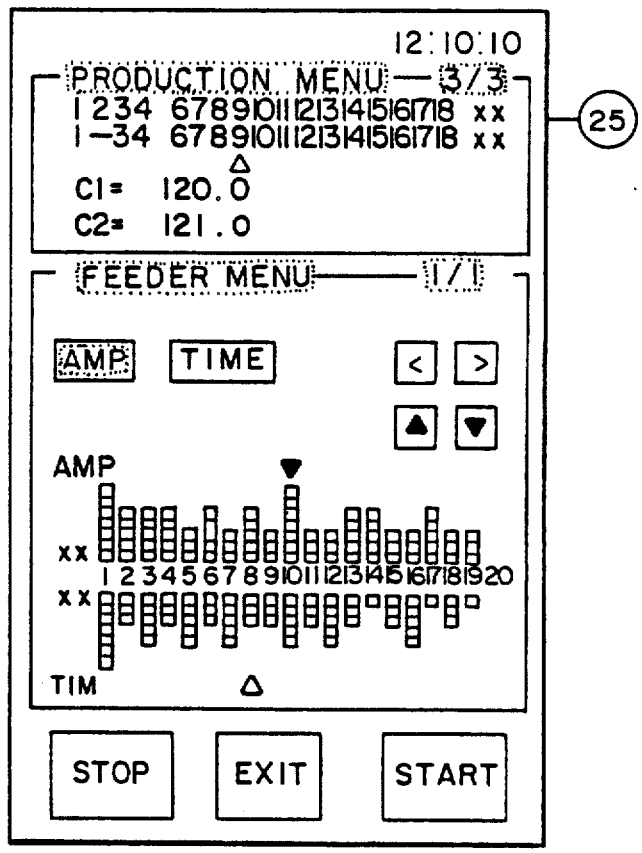
Figure 5E:
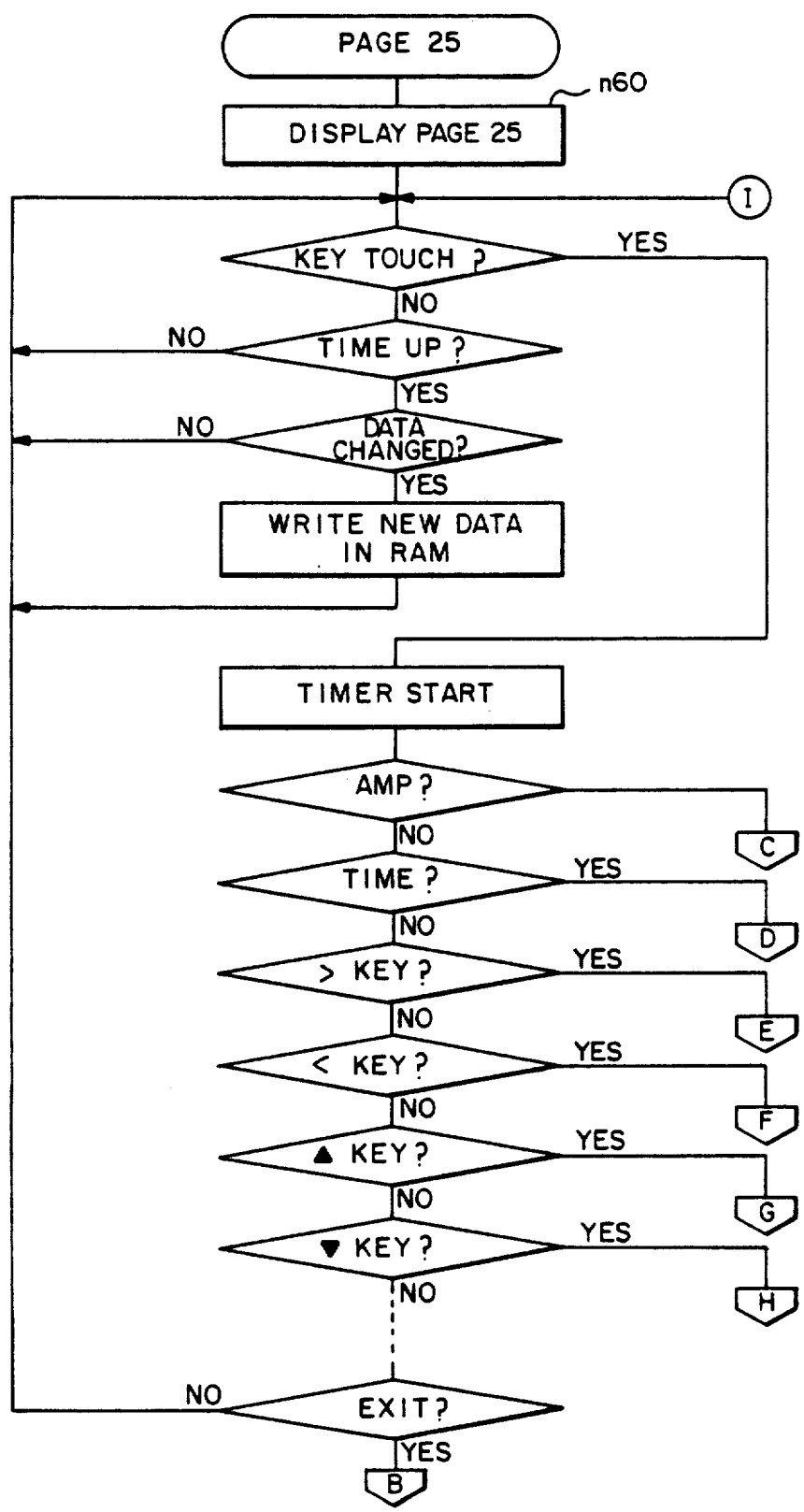
Figures 3, 5F:
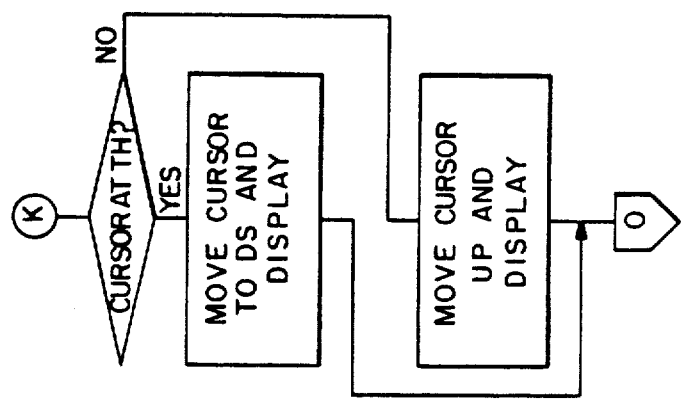
Figures 2, 5G:
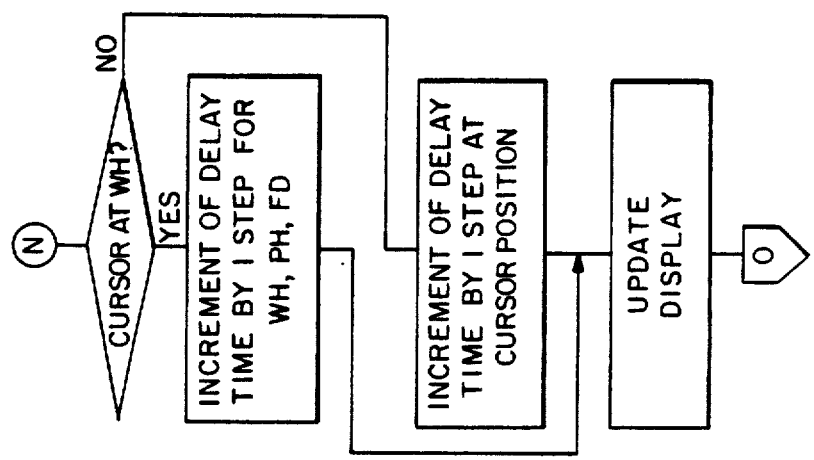
Figures 1, 5G:
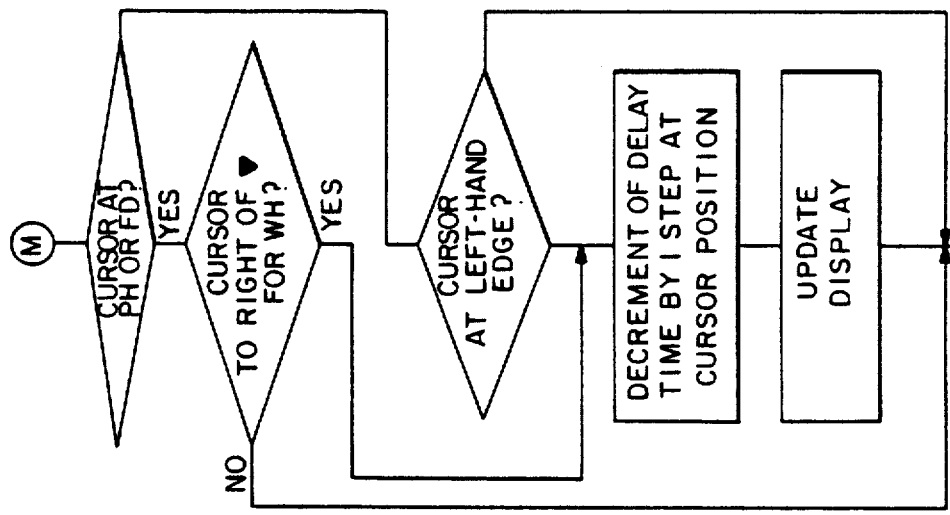

With reference to both FIGS. 4 and 5, a command to display Page 0 is initially transmitted to the GDC 57 (n1). As shown in FIG. 4, wherein page numbers are indicated inside circles, Page 0 displays, in addition to the date, the model number of the system and the like, a message "ENTER PASSWORD" and a number of keys inclusive of numeric keys and an entry key indicated by a downward pointing arrow. A timer is started immediately (n2) and if no key is touched NO in n3) within a set time (YES in n4), a command to display Page 2 is automatically transmitted to the GDC 57 (n10). Alternatively, the program may be so written (as schematically shown by a dotted arrow in FIG. 4) that the user is required to touch the entry key to have Page 2 displayed. A password is predefined so that only qualified persons informed thereof are permitted to set or reset certain parameters. If the user forms a "word" by using the numeric keys and touches the entry key, the program examines whether the correct password has been entered (n5) and if so, a command to display Page 1 is transmitted to GDC 57.

Page 2 contains a message "TOUCH MENU KEY" as shown in FIG. 4 and several keys are displayed. The computer waits until the touch screen 50 is touched (n11). Some of the displayed keys have the same name as one of the items in the menu for Model CCW-S-21X manufactured and sold by the present assignee The ZERO ADJUST key (n12) relates to zero-point adjustment. The PRODUCT START key is for starting a normal weighing process. The SYSTEM DRAIN key relates to discharging of all articles remaining in the system either when the articles being weighed are to be changed or at the end of the day. The CALCULATION key is used as a verification and diagnostic tool by displaying the selected weighing devices and the weight values from each. The PRINT TOTAL key is for printing out all stored results of weighing, for example, at the end of the day. If the PREARRANGEMENT key is touched (n13), a command to display Page 4 is transmitted to GDC 57 (n21), Page 2 disappears and Page 4 appears on the screen, the corresponding menu for "PREARRANGEMENT" becoming accessible through Pages 4, 5 and 6. The user can go from Page 2 to Page 0 by touching the EXIT key (n14) and to Page 3 by touching the NEXT PAGE key (n15) to cause a command for the display of Page 3 to be transmitted to GDC 57 (n16).

After Page 3 is displayed on the screen, the computer waits until the user touches one of the displayed keys (n17). If the SPAN ADJUST key is touched (YES in n18), a command to perform span adjustment is transmitted. Span adjustment means, as is well known in the art, an adjustment made in such a way that, when an analog signal representing a weight value obtained by a weighing device is converted into a digital signal, this digital signal will correspond to a value by which the user wishes to represent the actual weight of the weighed load. By touching the SETUP A key on Page 3 (n19), the SETUP B key Page 3 (n20) and the SETUP C key on Page 1 (n8), the user can reach the menus for the aforementioned three groups of conveniently assembled parameters through Pages 10 and 11, Pages 14 through 16 and Page 19, respectively.

The "PREARRANGEMENT" menu covers Pages 4 through 6. when the PREARRANGE key on Page 2 is touched (n13), Page 4 appears immediately (n21) with a display of keys and a statement "PREARRANGEMENT NUMBER XX". In this display, "XX" indicates a reservation number representing a certain set of selected values as explained above by way of a simplified example. The user can go from Page 4 to Page 5 (n26) by touching the NEXT key on Page 4 (n24), from Page 5 to Page 6 (n29) by touching the NEXT key on Page 5 (n27), from page 6 to Page 4 (n21) by touching the FIRST key (n31), and from Pages 4, 5 and 6 to Page 2 (n10) by touching the EXIT key on the respective pages (n25, n28 and n32).

If the user touches the TARGET WEIGHT key on Page 4 (n22), the computer D creates display data for Page 7 and transmits them to GDC 57. Page 7 is displayed by a command to GDC 57 (n33). A new display is made on top of the previous display, that is, Page 7 shows a portion of Page 4 as shown in FIG. 4. Thereafter, the user may enter a new target weight value by using the numeric keys (n35) and the ENTRY key (n36). The new target weight value thus entered is stored by the computer (n37) and Page 4 with updated target weight value is displayed (n38). The user can similarly update values of the other parameters included in this menu. The UPPER LIMIT key is touched to set a new value of the weight over the target weight value which is permitted to be discharged as a proper weight. The FEEDER MIN. AMP key is touched to set a new value representing the feeder vibration strength. The SPEED key is touched to set a new number of bags per minute discharged by the weighing system. The appropriate value is determined by many factors such as the product characteristics, target weight and the specifications of the bag maker. The DUMP key is touched to set a new number of times articles are to be discharged from the system to deliver the target weight. The PRODUCT CODE key is touched to identify the product code on the printer and the PRODUCT NAME key is touched to identify the product name on the display as programmed for the aforementioned Model CCW-S-21X of the assignee corporation.

The FEEDER DATA key is touched to set the vibration strengths and time intervals of the radial feeders each associated with one of the eighteen article batch handling units and the centrally located dispersion feeder. According to one aspect of the present invention, setting of these data is achieved graphically rather than by entering numbers. When the FEEDER DATA key is touched on Page 4 (YES in n23), a command is transmitted to GDC 57 to display Page 8 (n39). Page 8 is characterized as displaying the amplitude (AMP) and time interval (TIME) of vibration of each radial feeder (1-18) and the dispersion feeder (shown as the 19th feeder) in the form of a bar graph rather than as numeric data, thus enabling the user not only to visually comprehend the currently set mode of vibration of the feeders but also to change these modes directly from the graph.

If the user touches the AMP key (n40) to modify the amplitude of vibrations of one of the feeders, the AMP key and the cursor pointing downward light up (n46). If the user touches the TIME key (n41) to modify the time interval of feeder vibrations, the TIME key and the cursor pointing upward light up (n47). These cursors can be moved sideways by touching the right arrow and left arrow keys (n42 to n48 or n49 and n43 to n51 or n52). After selecting a feeder by moving a cursor sideways, the user can make the corresponding bar longer (n44 to n54 or n55) or shorter (n45 to n58 or n59). Each time the increase key is touched (n44), the corresponding bar becomes longer by one square and each time the decrease key is touched (n45), the corresponding bar becomes shorter by one square, thereby changing the amplitude and/or time interval of vibration of the corresponding feeder. A command is transmitted thereafter to GDC 57 and the updated Page 8 is displayed (n50, n53 or n56) and this concludes the reservation process regarding feeder data. The user can similarly set or reset the parameters indicated on Page 5 and proceed to Page 6 or go back to page 2 by touching the NEXT key (n27) or the EXIT key (n28), respectively.

From Page 6 of the "PREARRANGEMENT" menu, the user can touch the LEVEL key to set the weight of articles which the system aims to feed onto the dispersion feeder, for example, by controlling a feed conveyor, the TARGET COUNT key to set the target count value if combinational calculation is effected by measured numbers of articles. If one of the three SETUP keys is touched (n30, for example) a display similar to the one on Page 7 appears and the user can change the. reservation number in a similar manner. Flow chart for Page 9 is nearly the same as that for Page 7 and hence will not be described.

Parameters in SETUP A, B and C menus can be set and reset, or the values of parameters identified by a reservation number in each of these menus can be defined or redefined by touching the corresponding SETUP key. As mentioned above, the parameters within each SETUP menu are selected such that those grouped together in each menu frequently take same sets of values. In other words, it is important in programming the computer D to properly identify one or more groups of parameters such that they frequently take same sets of values. According to the example shown in FIGS. 4 and 5, three such groups are identified and shown in the SETUP A, B and C menus but specific identification and grouping of these parameters are not intended to limit the scope of the invention.

To briefly describe the SETUP A menu, sub-items belonging to this menu are displayed on Pages 10 and 11 and if the user wishes to change the combination of values corresponding to a reservation number, the key representing the sub-item for which the value is to be changed is touched. If the key titled "OFFSET" is touched, for example, Page 12, which is similar to Page 7, is displayed with a title and input keys. The user can enter by touching these keys a new value for the parameter corresponding to this sub-item (titled "OFFSET") for the displayed reservation number. The key titled "FEED CONTROL" is for determining whether the feeders are to be controlled automatically or manually. If the user touches this key, Page 13 with only two keys appears because the parameter for this sub-item can take only two values, that is, "AUTO" and "MANUAL". Pages which are displayed when the other keys on Pages 10 and 11 are touched are similar and will not be described individually.

The SETUP B and C menus are similarly operated to set or reset values of parameters corresponding to any of the reservation numbers for the menu. Whenever one of the displayed keys is touched on Pages 14, 15 and 16 of the SETUP B menu or Page 19 of the SETUP C menu, a display similar to that shown in Page 12 or Page 13 appears and the user can choose a new operating condition. For example, Pages 17 and 18 with format similar to that for Page 13 appear when the WEIGHER TYPE and the LEVEL SENSOR keys on the SETUP B menu are touched, respectively. Pages 20, 21 and 22 can be displayed similarly from Page 19.

The purpose of the present invention to simplify the operation of an operating system such as a combinational weighing system is further achieved by enabling the user to set some of the operating conditions while visually perceiving the currently set conditions. If the user touches the PRODUCT START key on Page 2 of FIG. 4 to start a normal production program, Page 23 appears and the user can touch the up or down key thereon to change the Preset No. to specify a desired item. If the user thereafter touches the START key, Page 24 appears with display of FEEDER ADJUST and HOPPER TIMING keys. If the FEEDER ADJUST key is touched, Page 25 appears (n60). Operations from Page 25 are programmed similarly to those for Page 8. If the HOPPER TIMING key is touched, Page 26 appears (n61). Page 26 shows graphically the currently set timing sequence by which hoppers and feeders (FD and DS respectively for "radially feeder" and "dispersion feeder") of the individual article batch handling units are activated. As shown by the flow chart for Page 26 in FIG. 5, the cursor (blinking light) can be moved vertically by the up and down keys to indicate the desired component and a corresponding marker can be moved horizontally by touching the left and right keys to change the setting.

The foregoing description of a preferred embodiment of the invention has been presented for purposes of illustration and description. It is not intended to be exhaustive or to limit the invention to the precise form disclosed. For example, the number of article batch handling units and other specifications of the combinational weighing system to which the method and device of this invention are applied and/or incorporated do not limit the scope of the invention. The method and device of this invention can be used in connection with many types of systems requiring a number of parameters to be set. The bars in the bar graphs need not be represented by a series of square boxes as shown in FIG. 4. In fact, the expression "bar graph" as used herein should be broadly construed to include any visual, graphic representation of a quantity. They may be represented by a series of dots, hyphens, etc. According to one embodiment of the present invention, the various computers and the touch screen employed in the system shown in FIG. 3 were as follows:

Main Computer A and Computer B: Model I-8086 or I-8088, manufactured by Intel Corporation of California Head Computers C, Computer D and Computers for TH, IH and DF: Model HD-6301 or Z-80 manufactured by Hitachi, Ltd. of Tokyo Touch Screen: Manufactured by Matsushita Electric, Inc. of Osaka, Japan but these specific choices do not limit the present invention. Any such modifications and variations which may be apparent to a person skilled in the art are intended to be within the scope of this invention.

What is claimed is:

1. A method of setting a plurality of parameters of a system comprising the steps of
    selecting parameter values by which operating conditions of said system are adjustably set,
    identifying a group of said parameters which assume the same value under different conditions of use of said system, said group of parameters being less than all of said plurality of parameters,
    storing in a memory the parameter value of said group as a combination, and
    assigning a reservation number to said combination.

2. The method of claim 1 further comprising the step of displaying on a screen a menu including one or more of said parameters.

3. The method of claim 2 wherein said menu includes an indicator and a bar graph with one or more bars each of a length which is an integral multiple of a unit length.

4. The method of claim 3 further including the step of selecting one of said bars by moving said indicator on said screen and changing the length of said selected bar by said unit length.

5. The method of claim 2 wherein said screen is a touch screen and said specifying said comprises touching said touch screen.

* * * * *